(12) United States Patent
Ikenoue

(10) Patent No.: US 8,331,619 B2
(45) Date of Patent: Dec. 11, 2012

(54) IMAGE PROCESSING APPARATUS AND IMAGE PROCESSING METHOD

(75) Inventor: Shoichi Ikenoue, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 426 days.

(21) Appl. No.: 12/595,634

(22) PCT Filed: Jan. 28, 2009

(86) PCT No.: PCT/JP2009/000317
§ 371 (c)(1),
(2), (4) Date: Dec. 16, 2009

(87) PCT Pub. No.: WO2009/113231
PCT Pub. Date: Sep. 17, 2009

(65) Prior Publication Data
US 2010/0128927 A1    May 27, 2010

(30) Foreign Application Priority Data

Mar. 14, 2008  (JP) ................................ 2008-065199
Sep. 4, 2008   (JP) ................................ 2008-227643

(51) Int. Cl.
 *G06K 9/00* (2006.01)
 *H04N 5/225* (2006.01)
(52) U.S. Cl. ........................................ 382/103; 348/169
(58) Field of Classification Search .................. 382/103,
 382/107, 156, 170, 176, 190, 199, 270, 271,
 382/279, 159, 165, 181, 236, 287; 348/169,
 348/170, 171, 172, 94, 154, 155, 208.14,
 348/208.16, 352
See application file for complete search history.

(56) References Cited

U.S. PATENT DOCUMENTS

| | | | | |
|---|---|---|---|---|
| 5,760,922 A | * | 6/1998 | Kojima | .......................... 358/464 |
| 5,872,864 A | * | 2/1999 | Imade et al. | .................... 382/176 |
| 2002/0080425 A1 | | 6/2002 | Itokawa | |
| 2003/0103647 A1 | | 6/2003 | Rui et al. | |
| 2008/0063236 A1 | | 3/2008 | Ikenoue et al. | |

FOREIGN PATENT DOCUMENTS

JP    7-99581    4/1995

(Continued)

OTHER PUBLICATIONS

Notification of Reason(s) for Refusal dated Feb. 15, 2011, from corresponding Japanese Application No. 2009-527636.

(Continued)

*Primary Examiner* — Abolfazl Tabatabai
(74) *Attorney, Agent, or Firm* — Katten Muchin Rosenman LLP

(57) ABSTRACT

By a method such as foreground extraction or facial extraction, the area of a target object is detected from an input image, and the feature amount such as the center of gravity, size, and inclination is acquired. Using the value of a temporarily-set internal parameter, edge image generation, particle generation, and transition are carried out, and a contour is estimated by obtaining the probability density distribution by observing the likelihood. Comparing a feature amount obtained from the estimated contour and a feature amount of the area of the target object, the temporarily setting is reset by determining that the value for the temporary setting is not appropriate when the degree of matching of the both is smaller than a reference value. When the degree of matching is larger than the reference value, the value of the parameter is determined to be the final value.

16 Claims, 15 Drawing Sheets

FOREIGN PATENT DOCUMENTS

| | | |
|---|---|---|
| JP | 8-329254 | 12/1996 |
| JP | 9-138471 | 5/1997 |
| JP | 10-20998 | 1/1998 |
| JP | 2002-56393 | 2/2002 |
| JP | 2003-216951 | 7/2003 |
| JP | 2005-173748 | 6/2005 |
| JP | 2005-311725 | 11/2005 |
| JP | 2006-285358 | 10/2006 |
| JP | 2006-322795 | 11/2006 |
| JP | 2007-285762 | 11/2007 |
| JP | 2007-328746 | 12/2007 |
| JP | 2008-26974 | 2/2008 |

OTHER PUBLICATIONS

International Preliminary Report on Patentability and Written Opinion of the International Searching Authority dated Sep. 14, 2010, from the corresponding International Application.

Michael Isard, et al. "Contour Tracking by Stochastic Propagation of Conditional Density" In Proc. European Conf. Computer Vision, 1996, pp. 343-356.

Michael Isard, et al. "CONDENSATION—Conditional Density Propagation for Visual Tracking" Int. J. Computer Vision, 1998.

Michael Isard, et al. "ICONDENSATION: Unifying Low-Level and High-Level Tracking in a Stochastic Framework" Proc. 5th European Conf. Computer Vision, 1998.

International Search Report dated May 19, 2009, from the corresponding International Application.

Notification of Reason(s) for Refusal dated Nov. 30, 2010, from corresponding Japanese Application No. 2009-527636.

* cited by examiner

IMAGE PROCESSING APPARATUS AND IMAGE PROCESSING METHOD

TECHNICAL FIELD

The present invention relates to information processing techniques, and in particular to an image processing apparatus for extracting features by analyzing an image and to an image processing method performed therein.

BACKGROUND ART

Techniques for generating images as well as various techniques in which image analysis is used have been suggested because of the development of recent image processing techniques and information processing apparatuses. Among them, techniques for extracting the contour of a target object play key roles in a wide range of fields such as visual tracking, computer vision, and analysis and retouching of medical images. The contour of a target object in an image can be considered as a part of an edge. Thus, an edge extracting filter is often used for the extraction of contour lines. For example, in the condensation (conditional density propagation) algorithm for visual tracking techniques, a finite number of particles are used to express the probability distribution of the existence of a target object, and the subsequent existence probability distribution is estimated by matching with an edge image a candidate contour, which is determined by one particle, having the same shape as the target object and then by observing the likelihood of each particle (see, e.g., non-patent documents 1-3).

At the same time, as a technique for extracting contour lines, active contour models (Snakes) have been proposed where the contour model of a target object is expressed by a closed curve, and the contour of the target object is estimated by deforming the closed curve so that an energy function defined in advance is at a minimum (see patent documents 1-2).

[Non-patent document 1] Contour tracking by stochastic propagation of conditional density, Michael Isard and Andrew Blake, Proc. European Conf. on Computer Vision, vol. 1, pp. 343-356, Cambridge UK (1996)

[Non-patent document 2] CONDENSATION—conditional density propagation for visual tracking, Michael Isard and Andrew Blake, Int. J. Computer Vision, 29, 1, 5-28 (1998)

[Non-patent document 3] ICondensation: Unifying low-level and high-level tracking in a stochastic framework, Michael Isard and Andrew Blake, Proc 5th European Conf. Computer Vision, 1998

[Patent document 1] JP 9-138471

[Patent document 2] JP 8-329254

DISCLOSURE OF INVENTION

Technical Problem

In general edge extracting filtering, there are frequent occasions, due to an imaging condition or a configuration parameter, where a detailed shadow or pattern other than a contour is extracted or where a contour is interrupted or is not extracted. This is attributed to the fact that there are some situations in edge extracting filtering where it is difficult to extract only contours due to the change in the edge extracting frequency of an entire screen, which is caused by the setting of a threshold, since an edge area is determined by the threshold for the intermediate value obtained by the filtering. On the other hand, in active contour models, there are some matters such as that default setting of a contour model is required for each target object and that the final result is affected by the default setting. There is also a problem of not being able to follow the change in the shape of a target object when the contour of the target object in a moving image is sequentially required as for the above-mentioned visual tracking techniques.

In order to follow a target object by using the condensation algorithm, various internal parameters need to be set. For example, in order to observe the likelihood of a particle after the transition, the edge image of an input image needs to be generated for matching a candidate contour and a real contour, and an edge extraction condition on this occasion needs to be set in advance. In addition, parameters or the like also need to be set that describe the initial distribution or motion model of particles. The optimal values of these internal parameters change in accordance with conditions such as the brightness of the input screen, or the initial position or movement of the target object. Therefore, an adjustment of the internal parameters in accordance with the imaging environment is necessary to maintain a high tracking accuracy for various imaging environments. However, the internal parameters cannot easily be adjusted by a user based on his/her sense as the adjustment of the brightness of a screen. Thus, it has been a challenge to achieve a tracker that can be adapted to any image captured in any environment.

In this background, a purpose of the present invention is to provide a technique for extracting the contour of a target object at high speed regardless of the contents of an image. Furthermore, another purpose is to provide a technique capable of highly accurate visual tracking regardless of any change in image-capturing environments.

Means for Solving the Problem

One embodiment of the present invention relates to an object tracker. The object tracker comprises: a tracking processing unit operative to perform a tracking process of a target object, based on an estimated existence probability distribution of a target object in a first image frame, by defining the candidate contour of a target object in a second image frame, observing the likelihood of the candidate contour by matching against an edge image of the second image frame, and estimating the existence probability distribution of the target object in the second frame, the first image frame and the second image frame forming a moving image in which the target object to be tracked is captured; a target object area detection unit operative to detect the area of the target object in the first image frame by a predetermined analysis method and acquire a predetermined feature amount representing the area; an initial contour estimation unit operative to obtain the estimated existence probability distribution of the target object in the first image frame by temporarily setting at least any one of the values of parameters the tracking processing unit uses for a tracking process and estimate the contour of the target object based on the estimated existence probability distribution; and an initial value determination unit operative to compare the feature amount of the area of the target object based on the contour estimated by the initial contour estimation unit and the feature amount acquired by the target object area detection unit and, when the result of the comparison satisfies a predetermined condition, allows the tracking processing unit to start a tracking process by applying the value of the parameter temporarily set by the initial contour estimation unit.

Note that it makes no difference if the first image frame and second image frame are two contiguous or discontiguous image frames in a video stream. The first image frame is usually observed prior to the second image frame in general object tracking over time, but this order is not limited thereto in the present embodiment.

The existence probability distribution may be located in the position coordinates of the target object in the image frame or may be located in the parameter space for an attribute of the target object, such as shape, color, size, or a combination thereof. The term "candidate contour" means a graphic form representing a candidate of the contour of a part or the whole of the target object. The term "likelihood" represents a measure of how well a candidate contour defines the target object. For example, the likelihood is a numeral representation of the degree of overlapping with the target object, the distance from the target object, etc.

Another embodiment of the present invention relates to an object tracking method. The object tracking method, whereby a computer performs a tracking process of a target object, based on an estimated existence probability distribution of a target object in a first image frame, by defining the candidate contour of a target object in a second image frame, observing the likelihood of the candidate contour by matching against an edge image of the second image frame, and estimating the existence probability distribution of the target object in the second frame, the first image frame and the second image frame forming a moving image in which the target object to be tracked is captured, comprises: reading the first image frame from memory storing a moving image, detecting the area of the target object in the image frame by a predetermined analysis method, and acquiring a predetermined feature amount representing the area; obtaining the estimated existence probability distribution of the target object in the first image frame by temporarily setting at least any one of the values of parameters used for a tracking process and estimating the contour of the target object based on the estimated existence probability distribution; and comparing the feature amount acquired in the acquiring the feature amount and the feature amount of the area of the target object based on the contour estimated in the estimating the contour and, when the result of the comparison satisfies a predetermined condition, starting a tracking process by applying the value of the temporarily-set parameter.

Another embodiment of the present invention relates to an image processing apparatus. The image processing apparatus comprises: a gradation lowering unit operative to generate a low-gradation image obtained by lowering the number of gradations of an image; and a contour image generation unit operative to generate a contour image, where the contour line of a subject in an original image is enhanced, by extracting an edge from the low-gradation image generated by the gradation lowering unit.

The image processing apparatus may further comprise: a candidate contour determination unit operative to determine the candidate contour of the target object in the second image frame based on the estimated existence probability distribution of the target object in the first image frame, the first image frame and the second image frame being contained in an image stream forming moving image data in which the target object to be tracked is captured; an observation unit operative to observe the likelihood of the candidate contour by matching the candidate contour determined by the candidate contour determination unit and the contour image of the second image frame generated by the contour image generation unit; and a tracking result obtaining unit operative to estimate the existence probability distribution of the object in the second image frame based on the likelihood observed by the observation unit.

Another embodiment of the present invention relates to an image processing method. The image processing method comprises: reading an image stored in memory and generating a low-gradation image obtained by lowering the number of gradations; and generating a contour image, where the contour line of a subject in an original image is enhanced, by extracting an edge from the low-gradation image.

Optional combinations of the aforementioned constituting elements, and implementations of the invention in the form of methods, apparatuses, systems, computer programs, and recording media recording computer programs may also be practiced as additional modes of the present invention.

Advantageous Effects

According to the invention, a visual tracker that can be adapted to the image-capturing environment of an input image can be achieved.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

Figure 1:
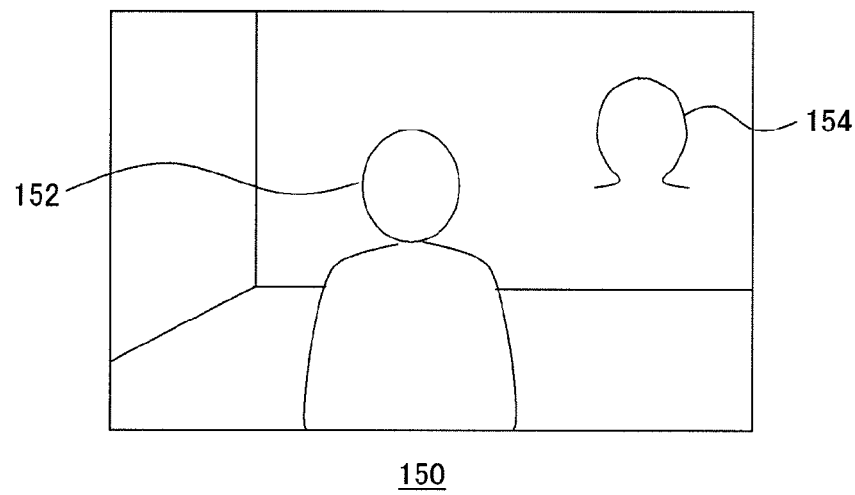
FIG. 1 illustrates a visual tracking method where a person is the target object.

EXPLANATION OF REFERENCE 10 visual tracking system
12 imaging device
14 tracker
16 display
20 image acquiring unit
22 contour image generation unit
24 image storage unit
26 tracking processor
28 tracking start-and-stop determining unit
29 sampling unit
30 observation unit
34 result obtaining unit
36 result storage unit
40 output control unit
50 contour image clipping unit
52 contour search task queue
54 likelihood acquiring unit
56 contour search unit
58a first processor
60a local memory
62 smoothing filter
64 gradation lowering unit
66 edge extraction filter
120 image processor
124 tracking environment setting unit
126 target object area detection unit
128 initial contour estimation unit
130 initial value determination unit
132 tracking processor
136 observation unit
138 result obtaining unit

BEST MODE FOR CARRYING OUT THE INVENTION

Embodiment 1

First, visual tracking using a particle filter will be described to clarify the features and advantages of the various embodiments of the present invention. FIG. 1 illustrates a visual tracking method where a person is the target object. The video stream to be processed, such as a live-action motion picture, or computer-generated animation, consists of image frames. A person image 150 is one of the image frames and shows a person 152 being the target object.

In order to track the motion of the person 152, the head and shoulder contours of the person 152 (hereinafter, simply referred to as the head contour) is approximated by an ohm-shaped curve 154 where the ohm-shaped curve 154 is described by a known representation. The person image 150, which shows the person 152, is subjected to an edge extracting process, and an edge image is thereby obtained. The shape and position of the curve 154 is then changed by changing the parameters describing the curve 154, and edge near the curve 154 is detected so as to obtain the parameters that best match the head contour of the person 152. The above process is repeated for each frame, so that tracking of the person 152 proceeds. In this instance, the edge usually refers to a position at which density or color changes drastically in an image.

The matching of various curves 154 and the head contour of the person 152 is implemented by a probability distribution prediction technique using a particle filter. Specifically, the number of the target candidates is reduced by increasing or decreasing the sampling number of the curve 154 according to a probability distribution in the parameter space of the previous image frame. As a result, it becomes possible to focus the search on areas where the existence probability is high, allowing for accurate, efficient matching.

Applications of the particle filter to tracking that focuses on object contours are described in detail in, for example, the non-patent document 3: Michael Isard and Andrew Blake, ICONDENSATION: Unifying low-level and high-level tracking in a stochastic framework, Proc. 5th European Conf. Computer Vision, 1998. The process required to apply such a tracking technique to the present invention is described below.

The ohm-shaped curve 154 is first described by a B-spline curve. The B-spline curve is represented by n control points $(Q_0, \ldots Q_n)$ and n knot points $(s_0, \ldots s_n)$. These parameters are preset to describe a fundamental curve shape, in this instance being an ohm shape. The fundamental curve described by the preset parameters is hereinafter referred to as the template $Q_0$. Note that the shape described by the template $Q_0$ depends on a target object and in the present instance is an ohm shape when the person 152 in the person image 150 shown in FIG. 1 is the target object. For example, when the target object is a ball, the curve to be described has a circular shape; when the target object is a palm, the curve has a palm shape.

Next, a shape-space vector x is given as the transformation parameters for changing the template shape. The shape-space vector x is represented by six parameters as follows:

$$x = (\text{shift}_x, \text{shift}_y, \text{extend}_x \cos\theta - 1, \text{extend}_y \cos\theta - 1, -\text{extend}_x \sin\theta, \text{extend}_y \sin\theta)^T \quad (1)$$

where $(\text{shift}_x, \text{shift}_y)$ is a translation amount in (x, y) direction, $(\text{extend}_x, \text{extend}_y)$ is a magnification, and $\theta$ is a rotation angle. Using the operational matrix W for operating the shape-space vector x on the template $Q_0$, the curve after transformation, i.e., the candidate curve Q, is represented as follows:

$$Q = Wx + Q_0, \quad (2)$$

$$W = \begin{pmatrix} 1 & 0 & Q_0^x & 0 & 0 & Q_0^y \\ 0 & 1 & 0 & Q_0^y & Q_0^x & 0 \end{pmatrix}$$

Equation (2) with the six parameters of the shape-space vector x changed accordingly makes it possible to translate, rotate, expand, and contract the template and combinations of these operations allow the candidate curve Q to change its shape and position accordingly.

Next, the edges of the person 152 close to the respective knots of multiple candidate curves are detected. The multiple candidate curves are described by the various parameters of the template $Q_0$, such as intervals of the control points and knot points, and various sets of the six parameters of the shape-space vector x. Likelihoods of the candidate curves are then calculated from, for example, the distances between the edges and the knot points. The probability density distribution in the six-dimensional space spanned by the six parameters of the shape-space vector x is estimated based on these likelihoods.

Figure 2:
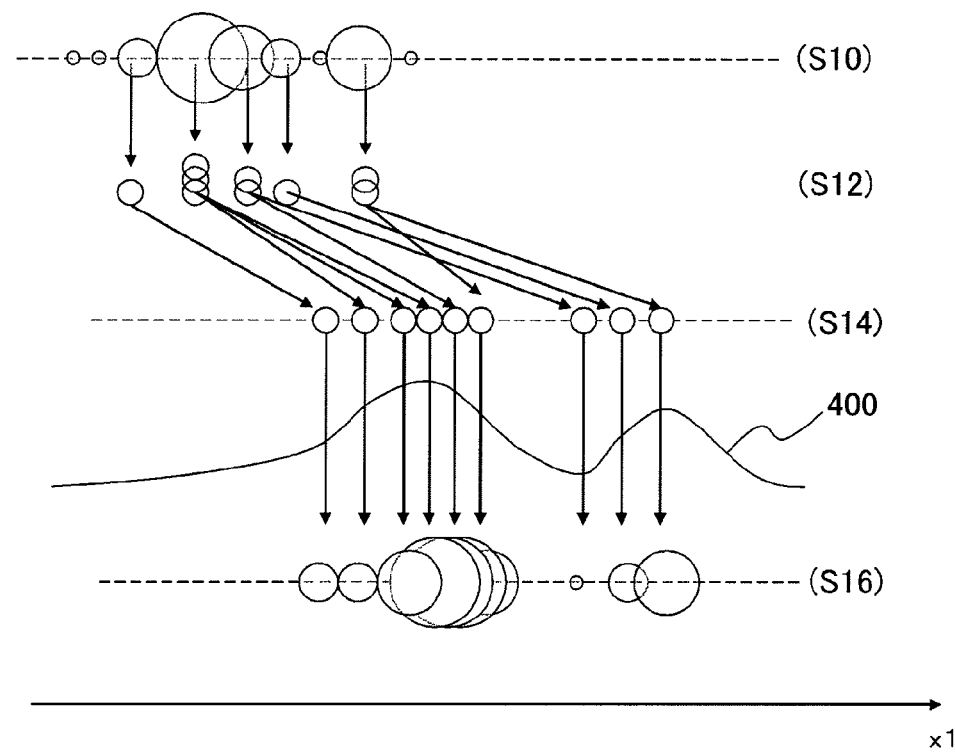
FIG. 2 illustrates a probability density distribution estimation using a particle filter.

FIG. 2 illustrates a probability density distribution estimation using a particle filter. In FIG. 2, the horizontal axis shows parameter x1, which is one of the six parameters of the shape-space vector x, to aid understanding of the present invention. However, it should be appreciated that the other parameters are actually processed in the same manner as the parameter x1 in the six-dimensional space. In this instance, consider the example where the image frame whose probability density distribution is to be estimated is at timestep t.

A probability density distribution in the axis for the parameter x1 is given (S10). This probability density distribution is estimated in the image frame at timestep t−1, which is one frame previous to the image frame at timestep t. Particles at timestep t are then created using the estimated probability density distribution (S12). If there are already particles obtained by filtering, it is determined at this point whether the particles are divided or eliminated. The probability density distribution given at step S10 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at timestep t−1 is described by particles with a high density, so that sampling is focused thereon; a low probability density region is described by particles with a low density, so that the sampling number is small. This allows for efficient matching by creating a large number of the candidate curves near the edge of the person 152, for example.

The particles are then caused to make a transition in the parameter space using a given motion model (S14). The motion model is, for example, a Gaussian motion model, or an autoregression motion model. The Gaussian motion model defines that a probability density at timestep t around each probability density at timestep t−1 shows a Gaussian distribution. The autoregression motion model is a technique that assumes an autoregression prediction model for sample data in more than two dimensions; for example, it assumes from changes in the previous parameters that the person 152 moves at a constant speed. With reference to FIG. 2, it is assumed by the autoregression motion model that the parameter x1 moves in the positive direction and the particles are transited accordingly.

The edges of the person 152 close to the candidate curve specified by each particle is searched for using the edge image obtained at timestep t, the likelihoods of the candidate curves are calculated using the search result, and the probability density distribution at timestep t is estimated based on these likelihoods (S16). As described above, the estimated probability density distribution discretely shows a true probability density distribution 400, as shown in S16. The probability density distribution at each timestep is described in the parameter space by repeating the above detailed process. For example, when a probability density distribution is unimodal, in other words, if there is only one target object, a curve of a contour closest to the target object is obtained by finally setting, as each parameter, a sum of the parameter values which are weighted with the probability densities.

The probability density distribution $p(x_t^i)$ at timestep t estimated in S16 is calculated as follows:

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \qquad (3)$$

where i is a unique particle number, $p(x_t^i|x_t^i, u_{t-1})$ is a given motion model, and $p(y_t|x_t^i)$ is a likelihood.

Figure 3:
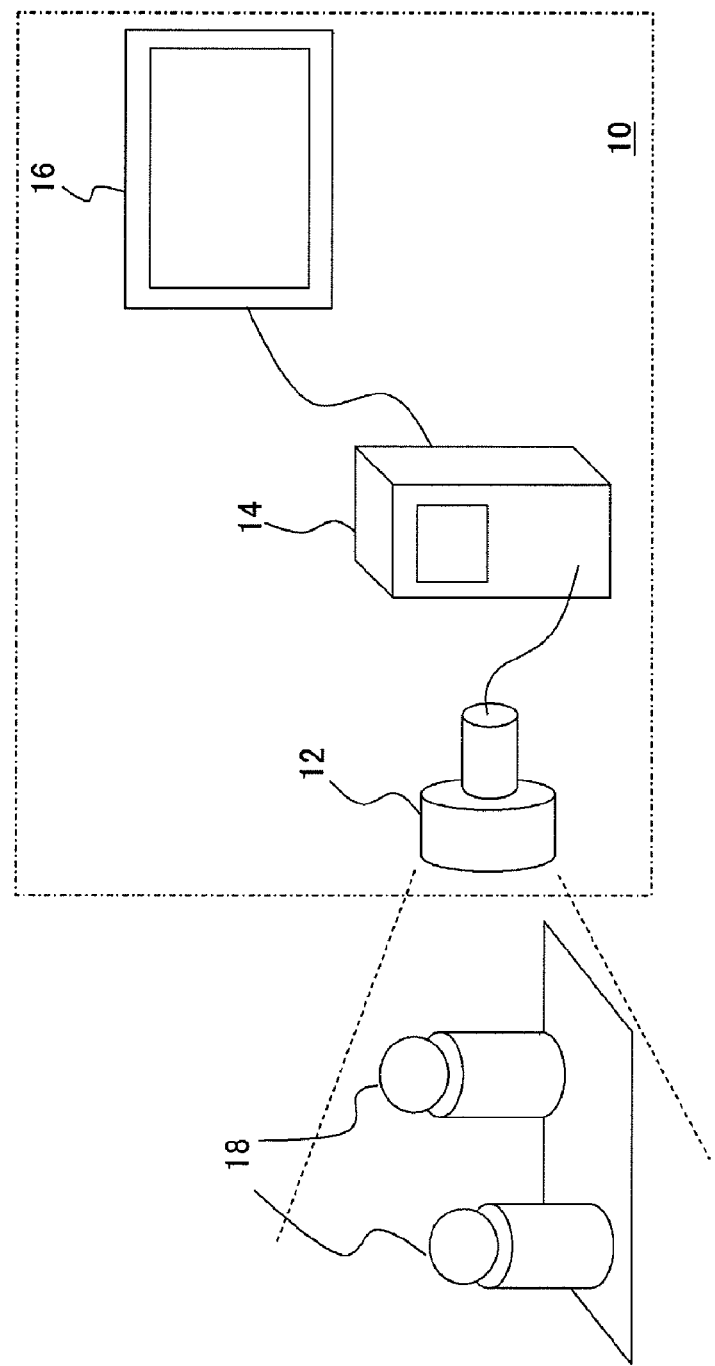
FIG. 3 shows an exemplary configuration of a visual tracking system according to the embodiment 1.

FIG. 3 shows a configuration of a visual tracking system according to one embodiment of the present invention. The visual tracking system 10 comprises an imaging device 12 that captures a target object 18, a tracker 14 that performs a tracking process, and a display 16 that shows image data obtained by the imaging device 12 and the tracking result data. The target object 18 depends on the intended use of the visual tracking system 10, and it is, for example, a person(s), an article(s), or their parts. However, in the following description, the target object 18 is a person as detailed above.

The tracker 14 and the imaging device 12 or the display 16 are connected to each other regardless of whether the connection is wired or wireless or they may be connected through specific networks. Alternatively, any two of or all of the imaging device 12, tracker 14, and display 16 may be integrally provided. In a certain use environment, the imaging device 12 and display 16 may not always be connected to the tracker 14.

The imaging device 12 acquires image data at a predetermined frame rate. The image data includes images of the target object 18 or images of a specific place with or without the target object 18 included. The image data acquired is input into the tracker 14 and a tracking process of the target object 18 is performed. The process result is then output to the display 16 as output data controlled by the tracker 14. The tracker 14 may be a computer that performs other functions that use, for example, the tracking result data, i.e., the position and shape information of the target object 18.

Figure 4:
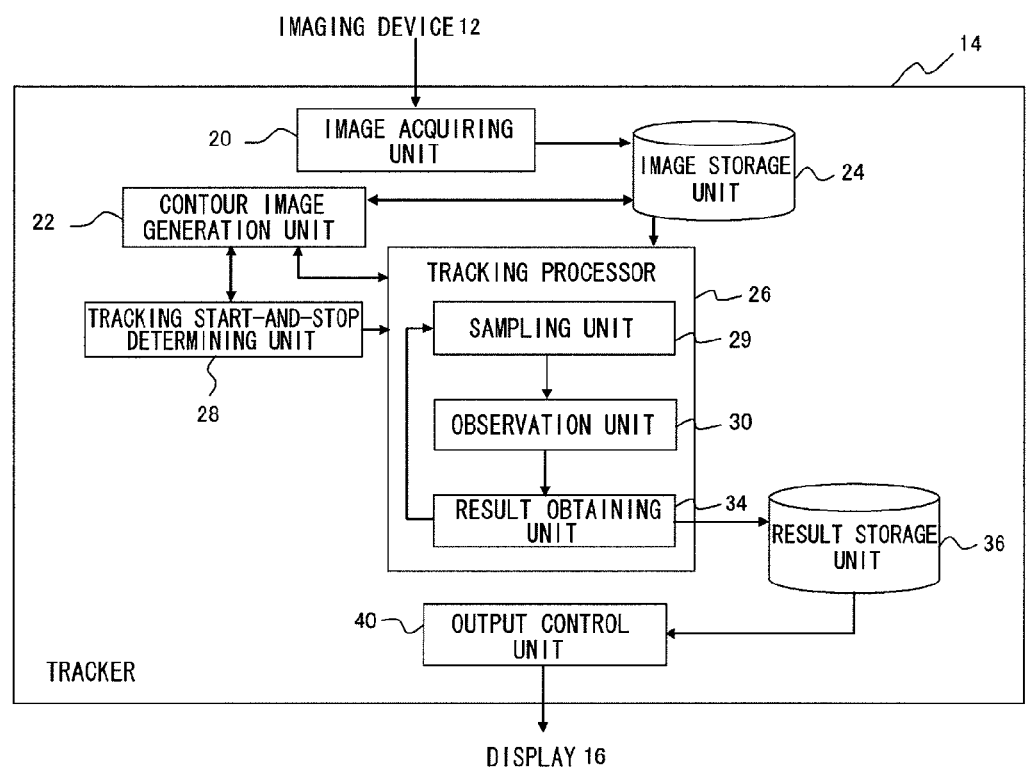
FIG. 4 shows the detailed configuration of the tracker according to the embodiment 1.

FIG. 4 shows the detailed configuration of the tracker 14 according to the embodiment. The tracker 14 comprises an image acquiring unit 20 that acquires the image data input by the imaging device 12, an image storage unit 24 that stores the input image data and the contour image data, an contour image generation unit 22 that generates a contour image from the input image data, a tracking start-and-stop determining unit that determines the starting and stopping of tracking, a tracking processor 26 which performs the tracking process using a particle filter, a result storage unit 36 that stores the final tracking result data, and an output control unit 40 that controls the output of the tracking result data to the display 16.

Figure 5:
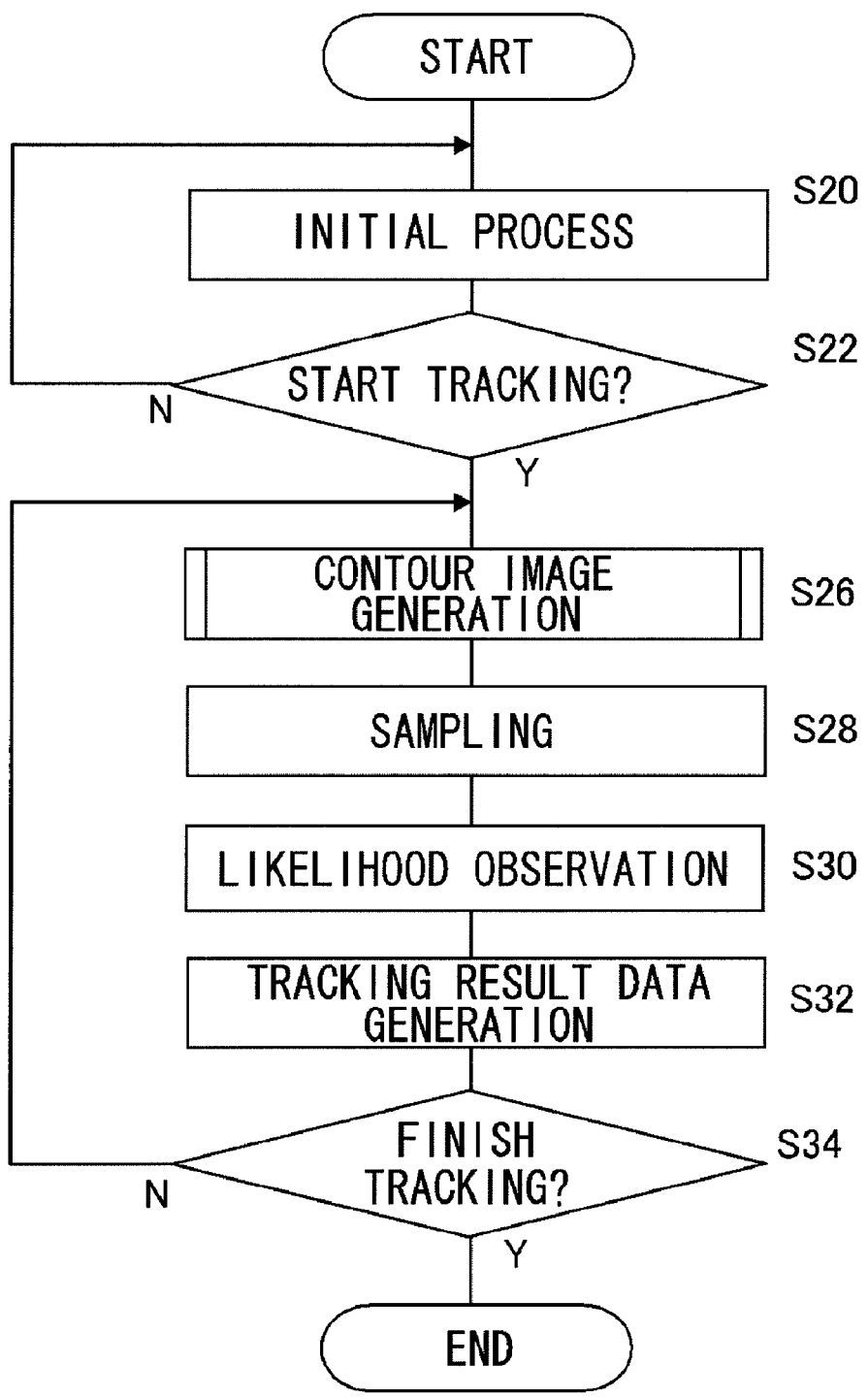
FIG. 5 is a flowchart showing the sequence of the tracking process according to the embodiment 1.

In FIG. 5, the components described as functional blocks which perform various processes are provided by hardware such as CPU, memory, and other LSI, or by software such as image processing programs and the like. Therefore, it will be obvious to those skilled in the art that the functional blocks may be implemented in a variety of manners by a combination of hardware and software.

The contour image generation unit 22 extracts the contour of the target object from the image frame of an input image and generates a contour image. The contour image is stored in the image storage unit 24 and is later used for the observation of the likelihood of candidate curves by the observation unit 30 of the tracking processor 26. Generally, a "contour" is treated as an "edge" in an edge image, and the observation of the likelihood is thus performed by using an "edge image" in the conventional techniques. However, in general edge extracting filtering, the observation of the likelihood can be considered not to be accurately performed due to matching edges other than contours since many edges other than contours of objects are extracted depending on input images. There is also a possibility that the observation of the likelihood is not accurately performed due to the discontinuity of contours when the number of edges is reduced by setting the threshold for the edge extraction to high.

The contour image generation unit 22 of the embodiment generates images that allow for highly accurate observation of the likelihood, focusing not on general "edge images" but particularly on the "contours" of objects in an input image. In the following explanation, images generated by the contour image generation unit 22 represent "contour images" and are distinguished from general "edge images". A description of a detailed method will follow. The contour image generation unit 22 may include a foreground extractor (not shown) that uses differences in backgrounds. The contours of target objects may be efficiently extracted by extracting the foreground including the target objects from an input image as a pretreatment for a contour image generation process.

The tracking start-and-stop determining unit 28, for example, evaluates the shape of the contour or foreground obtained by the contour image generation unit 22 and determines the starting and stopping of tracking based on predetermined conditions. The stopping includes suspension of tracking due to, for example, the occlusion. The tracking is started, for example, when the target object appears in the viewing angle of the imaging device or appears from behind something. The tracking is stopped, for example, when the target object passes out of the viewing angle of the imaging device or hides behind something. If it is determined that tracking is to be started, the unit 28 notifies the tracking processor 26 accordingly so as to cause the tracking processor 26 to start the tracking process.

The tracking processor 26 includes a sampling unit 29, an observation unit 30, and a result obtaining unit 34. The sampling unit 29 creates and eliminates particles based on the probability density distribution estimated for the image frame at the previous timestep t−1. The particles are then made to undergo a transition in the parameter space by applying a given motion model to all the particles. This allows for the determination of multiple candidate curves in the image frame obtained at timestep t. The sampling unit 29 starts the process when receiving a tracking start signal from the tracking start-and-stop determining unit 28, and stops the process when receiving a tracking stop signal.

The observation unit 30 observes the likelihood of the candidate curve defined by each particle that is generated, eliminated, and transited by the sampling unit. For example, when the candidate curve defined by each particle is expressed by the B-spline curve, the scoring of knots is performed by a predetermined rule by searching for the closest contour and by obtaining the distance in a contour image generated by the contour image generation unit 22 for each knot of the B-spline curve. Then, the likelihood of the candidate curve is obtained based on the scores of all the knots that constitute the candidate curve. The observation unit 30 performs the search process in parallel by using multiple processor units.

In the embodiment, the search process of a contour divided for each knot is specified as one processing unit and is parallel processed by the multiple processor units. A description of a detailed method will follow. In order to search for the closest contour to one knot, each processor unit copies in local memory in the unit's charge only image data of a part of area including the knot and the search area thereof in a contour image. By repeating the process by multiple processors, processing units of the number obtained by multiplying the number of particles by the number of knots that constitute the candidate curve are processed in a short period of time for each target object. The scores of the knots acquired in parallel by the respective processor units are integrated for each candidate curve, and the likelihood is then calculated. Conventional techniques can be employed for the method of scoring or likelihood calculation.

The result obtaining unit 34 computes the probability density distribution $p(x_t^i)$ given by Equation (3) based on the observed likelihood from the observation unit 30, computes a tracking result, and stores the result in the result storage unit 36. The tracking result may be data of the curve defined by parameters weighted by the corrected likelihood and averaged. The unit 34 returns the data to the sampling unit 29 in order to use it in a tracking process at time t+1. The data stored in the result storage unit 36 may be the values of parameters weighted and averaged, the image formed only by the curve defined by the parameters, or the data for the composite image composed of the curve and the input image.

If there is a plurality of target objects, the result obtaining unit 34 may perform tracking using templates specific to respective target objects for each target object and may combine the tracking results to obtain one tracking result. The result obtaining unit 34 also detects an overlap of the target objects and eliminates one from behind another at a certain timing in terms of the tracking process. Accordingly, even when a current target object hides behind another target object, and thus its observation likelihood temporarily goes down, it is possible to prevent the output of an incorrect tracking result.

By performing the aforementioned processes by the contour image generation unit 22 and the tracking processor 26 for each frame, the result storage unit 36 is capable of storing, for example, the data for moving image that includes the tracking result. In this case, the template curve may be shown moving in association with the movement of the target object by outputting the data for moving image to the display 16 under the control of the output control unit 40. As described above, in addition to being displayed in the form of a moving image, the tracking result may be, for example, output to another operation module depending on the purpose of tracking.

A detailed description will now be made of the operation of the tracker 14 by the configurations described thus far. Hereinafter, tracking of a person at a certain location will be described by way of example. The imaging device 12 captures an image of the target place at a predetermined frame rate. The captured image is input into the image acquiring unit 20 of the tracker 14 as input image data and is then stored in the image storage unit 24. The tracking process as described below will then be performed.

FIG. 5 is a flow chart showing the tracking process according to one embodiment of the present invention. Since the target object is a person, the template for an ohm-shaped curve is provided in the tracker 14 as described previously. The template may be described by other representations which can describe a desired curve, instead of the B-spline curve. Also, the template shape may be transformed by any method that is compatible with the template's description format and that flexibly transforms the shape by changing several types of parameters as mentioned above.

First, the tracking start-and-stop determining unit 28 reads the input image data stored in the image storage unit 24 for each image frame to determine whether to start tracking (S20, S22). For example, when a foreground object extracted from an image frame matches an object having a predetermined size and shape by which a person is identified, the tracking start-and-stop determining unit 28 starts tracking. The foreground size and shape being the criteria for determining a match may be determined in either a logical or experiential way. A foreground extracting process may be performed by a foreground extractor (not shown) included in the contour image generation unit 22. In this case, the tracking start-and-stop determining unit 28 requests the contour image generation unit 22 to perform the foreground extracting process. Alternatively, the tracking start-and-stop determining unit 28 may include a foreground extractor.

Steps S20 and S22 are repeated until the tracking start-and-stop determining unit 28 determines to start tracking. If the tracking start-and-stop determining unit 28 determines to start tracking (S22: Y), the tracking processor 26 starts a tracking process. In this instance, the image frame for which tracking is determined to start is assumed to occur at time t=0. Subsequent image frames are assumed to occur at time t=1, 2, 3, ..., respectively. The sampling unit 29 first requests the contour image generation unit 22 to perform the contour image generation process. In response to that, the contour image generation unit 22 generates the contour image of the image frame at t=0 (S26). The sampling unit 29 may requests the contour image generation process of a subsequent frame, and the contour image generation unit 22 may sequentially perform a process.

The sampling unit 29, for example, places particles uniformly over a certain region of the parameter space for sampling, the observation unit 30 observes the likelihoods by matching the candidate curve each defined by each particle with contour image, and the result obtaining unit 34 calculates the initial value $p(x_0^i)$ of the probability density distribution by Equation (3) (S28, S30, and S32).

On the other hand, the contour image generation unit 22 reads the image frame at t=1 from the image storage unit 24 and generates the contour image (S34:N, and S26). The sampling unit 29 performs sampling by generating particles, the number of which corresponds to the initial value $p(x_0^i)$ of the generated probability density distribution, over the parameter space, and by transiting the particles based on a predetermined motion model (S28). The number of particles generated is adjusted in consideration of the processing load based on the amount of calculation resources available in the tracker 14, the required rate of output result, and the like. A motion model offering accurate tracking such as a Gaussian motion model, an autoregression motion model, or the like is selected depending on the type of target object.

The observation unit 30 observes the likelihood $p(y_t|x_t^i)$ of the candidate curves defined by the particles after the transition (S30). Observation of the likelihood is performed by searching for contours in the neighborhood of the candidate curves, using the contour image at time t=1 generated by the contour image generation unit 22. As described above, the search processes are assigned to multiple processors for respective knots.

The result obtaining unit 34 then determines the probability density distribution $p(x_1^i)$ at time t=1 based on the observed likelihood. If there is a plurality of target objects, the above-described process is performed for all the target objects. The result obtaining unit 34 determines the shape and position of the target object at time t=1 by ultimately identifying the ohm-shaped curve obtained by weighting the parameters by the probability density distribution $p(x_1^i)$ and then averaging the weighted parameters. The unit 34 also generates desired tracking result data by, for example, generating image frames superimposed on the original input image frame and stores the resultant data in the result storage unit (S32).

The tracking start-and-stop determining unit 28 determines whether to continue or stop the tracking process (S34). For example, when a predetermined time has elapsed in the state where there is no foreground object having a predetermined size and shape by which a person is identified, the tracking start-and-stop determining unit 28 determines that the tracking process should stop. Alternatively, the tracking start-and-stop determining unit 28 determines to stop the tracking after a predetermined time has elapsed in the occlusion state, for example, when the current target object hides behind another target object in real space. The occlusion state may be estimated from the result of a past tracking process or may be detected by, for example, a distance measurement system (not shown). Furthermore, the tracking start-and-stop determining unit 28 detects, by a similar method for the occlusion, the state where a predetermined time has elapsed after the target object becomes out of the viewing angle of the imaging device 12 and determines to stop the tracking.

When the continuation of the tracking process is determined in S34 (S34:N), while an contour image is created from the image frame at timestep t=2, particles are created or eliminated by using the probability density distribution $p(x_1^i)$ obtained in S32 at timestep t=1 and are transited by applying the motion models, and the likelihood is observed and the probability density distribution is computed for the frame at timestep t=2 (S26-S32). The processes of S26 to S32 are repeated for each image frame until the tracking start-and-stop determining unit 28 determines to stop tracking in S34. Accordingly, video data in which an ohm-shaped curve changes its motion and shape over time while following those of the visitor's head, the target object, is stored in the result storage unit 36. The output control unit 40 outputs the video data to the display 16, or to a module providing other functions and the like, thereby enabling the user to use the tracking result as desired.

Figure 6:
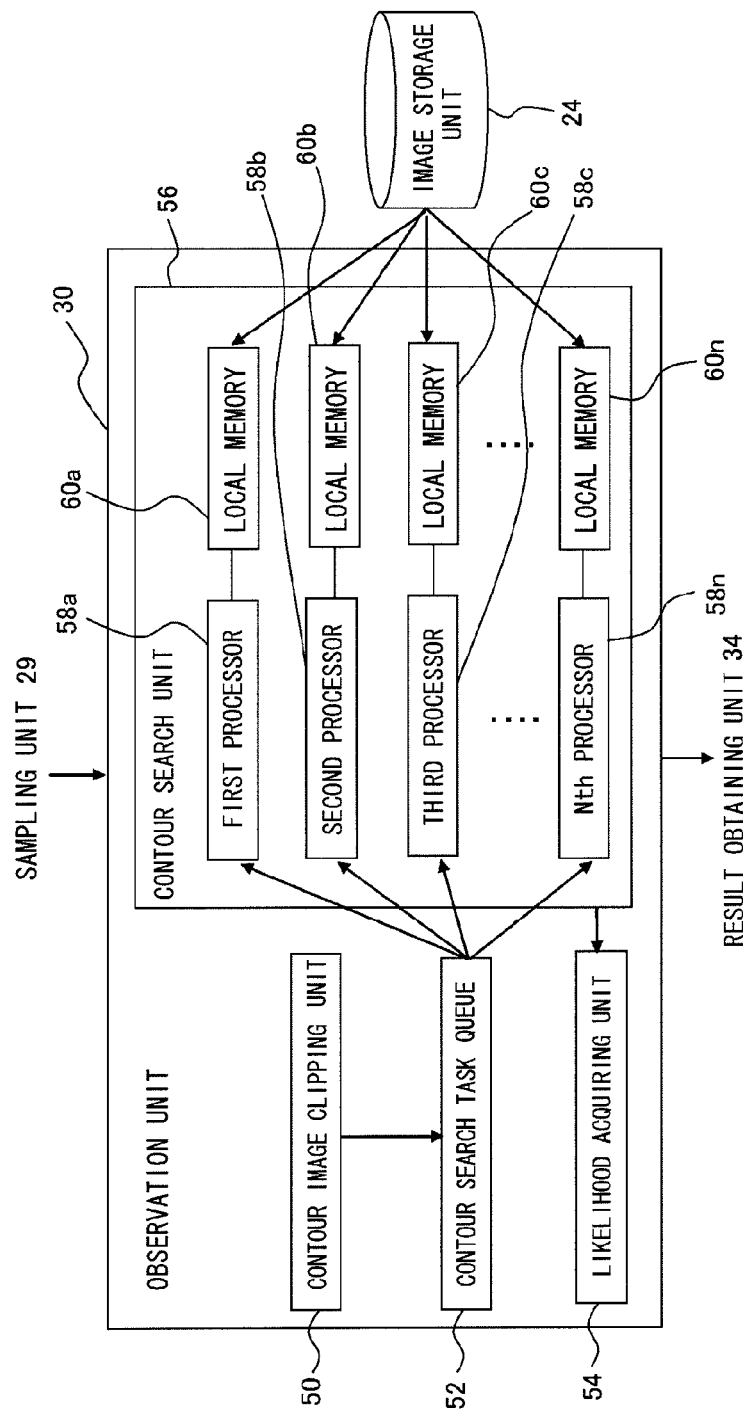
FIG. 6 shows the detailed configuration of an observation unit according to the embodiment 1.

A detailed description will be given of a process where the observation unit 30 observes the likelihood by matching the candidate curves and the contour of the contour image. FIG. 6 shows in more details the configuration of the observation unit 30. The observation unit 30 includes a contour image clipping unit 50, a contour search task queue 52, a contour search unit 56, and a likelihood acquiring unit 54. The contour image clipping unit 50 clips from the contour image an area that corresponds to each knot based on the coordinates of the knots of the curve representing the candidate curve. The area that corresponds to each knot represents an area that includes the knot and the search area for the knot. The area may be equal to the search area and is thus hereinafter also referred to as a "search area." A request is issued for processing a contour search, which includes the coordinate information of the knot and the information related to the corresponding area. The issued processing request is added to a process queue in the contour search task queue 52.

The contour search unit 56 includes Nth processing units, a first processor 58*a*, a second processor 58*b*, a third processor 58*c*, ..., an Nth processor 58*n*, and respectively connected local memory 60*a*, local memory 60*b*, local memory 60*c*, ..., local memory 60*d*. Each processing unit sequentially reads from the contour search task queue 52 a request for a contour search process and performs a contour search process on a requested knot. More specifically, the processing unit copies the image data of an area specified by a processing request to local memory in the unit's charge from a contour image stored in an image storage unit 24. Then, based on the coordinates of the specified knot, the unit searches, in the area copied to the local memory, for the closest contour line to the knot and performs scoring in accord with a predetermined rule.

A generally used method for an edge search can be used for the search for contours. A search area can be determined by a selected search method or by the accuracy required for matching. The first processor 58*a*, the second processor 58*b*, the third processor 58*c*, . . . , the Nth processor 58*n* each output obtained scores to the likelihood acquiring unit 54 upon the execution of one processing request. The subsequent request for a contour search process is then read from the contour search task queue 52, and a similar process is repeated.

The likelihood acquiring unit 54 combines the scores of the knots respectively input from the first processor 58*a*, the second processor 58*b*, the third processor 58*c*, . . . , the Nth processor 58*n* and computes the likelihood for each candidate curve. More specifically, the likelihood acquiring unit 54 collects and counts up the scores of all the knots that constitute the candidate curve, computes the average value, or substitutes the scores into a predetermined conversion equation. The scores for the knots are output in sequence from the processing units of the contour search unit 56. The information associating the identification information of the knots and the identification information of the candidate curve to which the knots belong is first commonly stored in the observation unit 30, and the results can be combined for each candidate curve by including necessary identification information when a processing request or a score is output.

Figure 7:
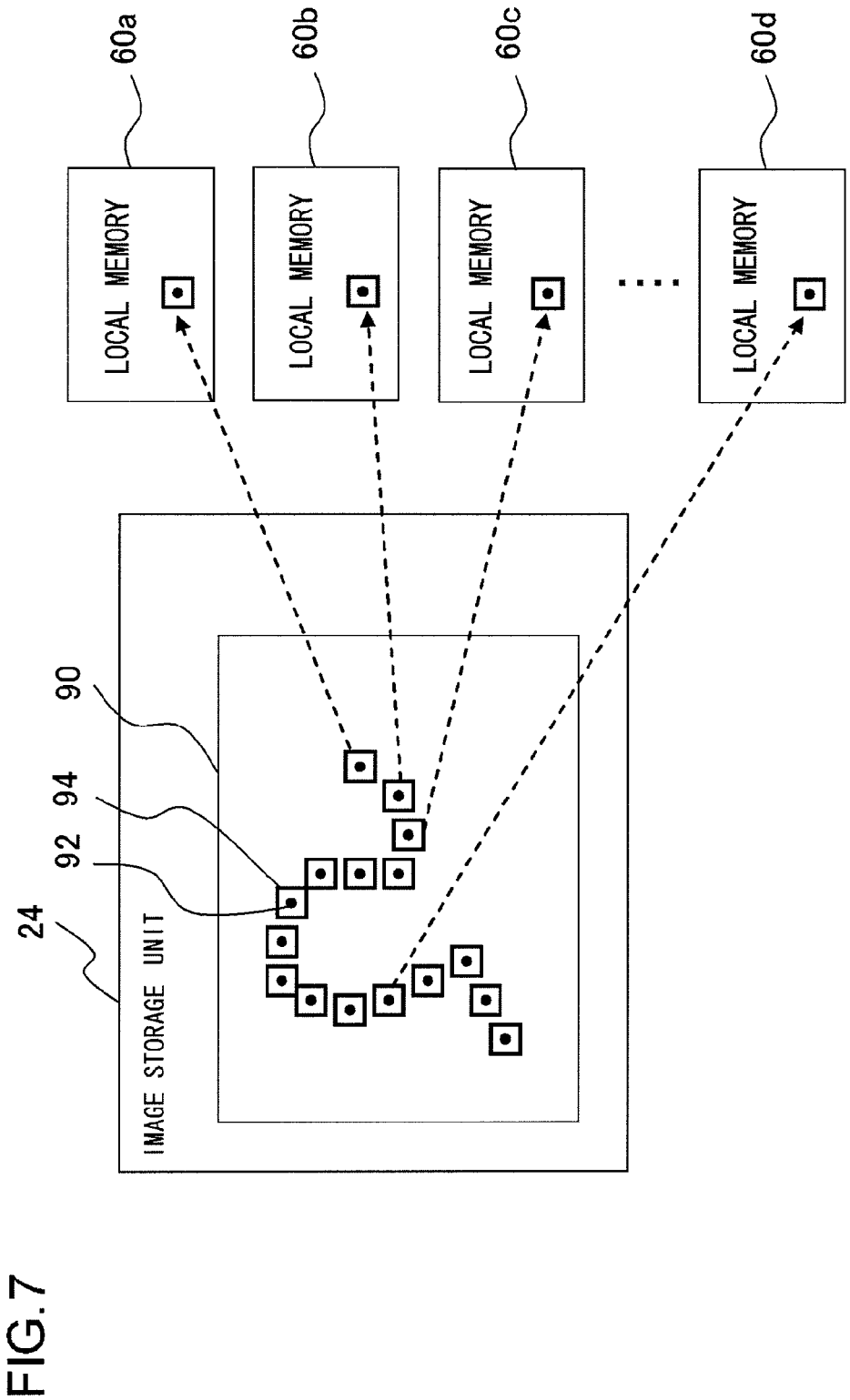
FIG. 7 schematically shows the image data, of an area cut out from a contour image stored in an image storage unit, being copied to each local memory in the embodiment 1.

FIG. 7 schematically shows the first processor 58*a*, the second processor 58*b*, the third processor 58*c*, . . . , the Nth processor 58*n* copying the image data of specified areas from the contour image stored in the image storage unit 24, in accordance with a request for a contour search process, to the respective local memory 60*a*, local memory 60*b*, local memory 60*c*, . . . , local memory 60*d*. A contour image 90 generated by the contour image generation unit 22 is stored in the image storage unit 24. The coordinates of each knot 92 of the candidate curve are determined by a particle determined by the sampling unit 29.

Upon the acquisition of the coordinates of the knots 92, the contour image clipping unit 50 cuts search areas 94 of the knots for each knot. The way of determining a search area is determined in consideration of the accuracy, the memory capacity, the processing speed, and the like. In the example of FIG. 7, squares having the coordinates of the knots 92 as their centers of gravity are cut out as the search areas 94. From the search accuracy perspective, the size of the search area 94 is preferably changed in accordance with the size of the candidate curve. For example, the maximum data size of the search area 94 for the maximum size the candidate curve can possible be is set so as to be equal to the maximum data size that can be stored in the copy areas of the local memory 60*a*, local memory 60*b*, local memory 60*c*, . . . , local memory 60*d*. The size of the squares is determined by changing the search areas 94 in accordance with the proportion of the size of the candidate curve. The size of the candidate curve can be determined based on the magnification (extend$_x$, extend$_y$) of the parameters of each particle.

The way of determining the search area 94 is not limited to the one shown in FIG. 7. As described hereinafter, the size of the search area 94 may be increased or decreased in consideration of the time required for copying the image data of the area to the local memory 60*a*, local memory 60*b*, local memory 60*c*, . . . , local memory 60*d*, the time required for the search process, or the like. The knot may not be at the center of gravity of the search area 94. For example, the movement of the target object may be estimated by the autoregression motion model used when the particle is transited by a motion model, and the search area 94 may be provided widely in the direction where the target object moves. The search area 94 may not be square-shaped and may be another shape such as rectangular or rhomboidal or may be a horizontal or vertical line of pixels, depending on the search method or the characteristics of the movement of the target object.

The contour image clipping unit 50 adds a request for a contour search process, which includes the information of the coordinates of the knot 92 and the corresponding search area 94, for example, the coordinates of a corner of a square and the length of a side of the square, to the contour search task queue 52. Upon reading one request for a contour search process from the contour search task queue 52, the first processor 58*a*, the second processor 58*b*, the third processor 58*c*, . . . , and the Nth processor 58*n* of the contour search unit copy, based on the information of the square included in the request, only the image data of the area of the square from the contour image 90 stored in the image storage unit 24 to the local memory in their charge.

In the embodiment, specifying a processing unit as a process for each knot limits the amount of data required for one processing unit. In other words, compared to when the search for a contour line for one candidate curve is specified as a processing unit, by dividing processes for each knot, the amount of data of a search area is greatly reduced and is hardly affected by the size of the candidate curve. This allows for the storage in the local memory regardless of the size of a target object. In general, local memory, while having a small capacity, permits high-speed access. Therefore, determining a search area for each knot and copying only the image data of the area allow a high-speed tracking process along with the effects by a parallel process. This effect can be obtained by any information processing apparatus having multiple processors. Having such a configuration allows for the easy application to information processing apparatuses including a "heterogeneous multicores."

A "heterogeneous multicore" is an information processing apparatus including heterogeneous cores and has characteristics such as that the memory capacity used by each core is small and that data necessary for processing needs to be copied to the memory of each core. As described above, determining the search area 94 allows the size of the image data thereof to be smaller than the memory capacity of each core. This allows for the application of the embodiment to a heterogeneous multicore, and a high-speed tracking process can be thus achieved without limiting the apparatus.

Any one of multiple processor units that achieve the features of the first processor 58*a*—the Nth processor 58*n* included in the contour search unit 56 may also function as the contour image clipping unit 50 and the likelihood acquiring unit 54. Furthermore, the features other than the observation unit 30 included in the tracker 14 may be realized by any one of the multiple processor units.

Figure 8:
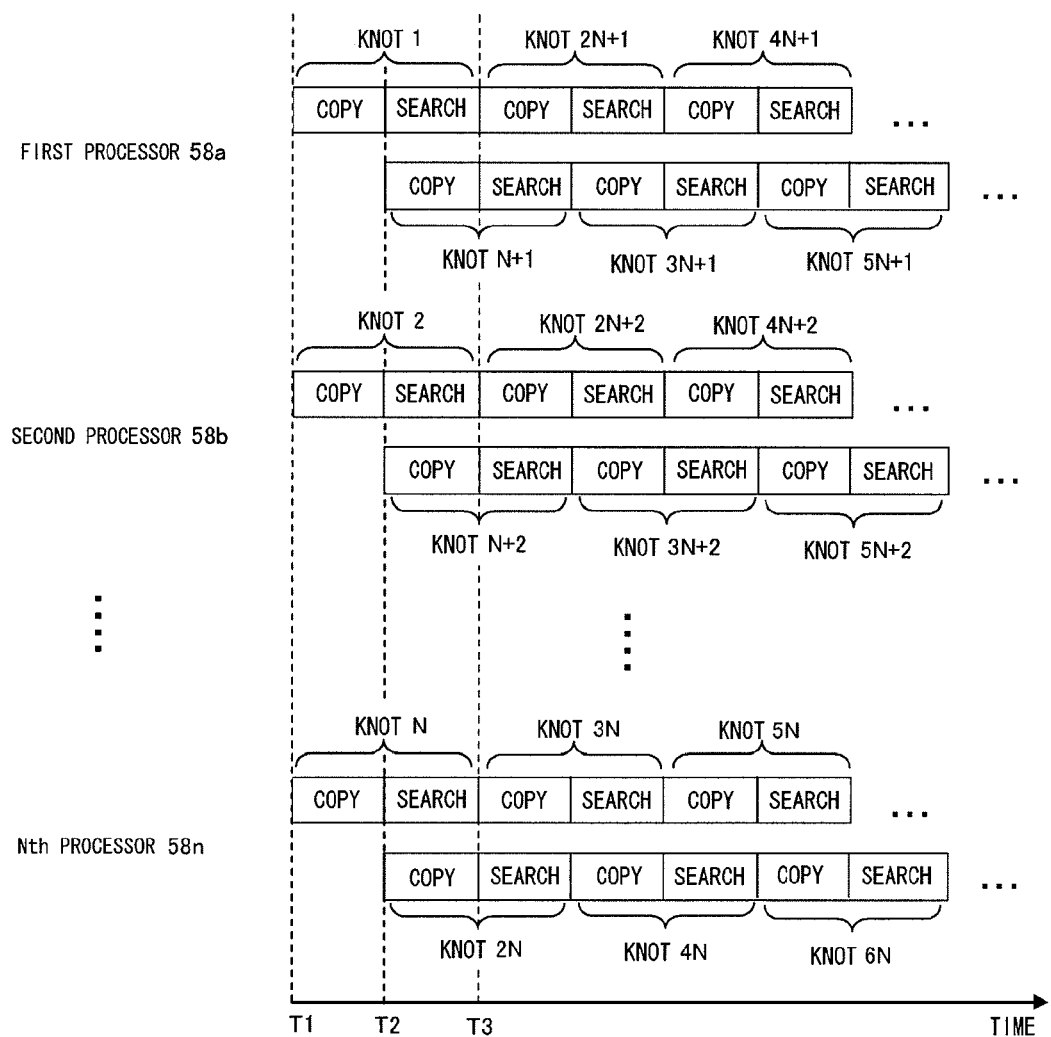
FIG. 8 schematically shows the transition of processes when a first processor, a second processor, . . . , and an N processor of a contour search unit perform contour search processes in the embodiment 1.

FIG. 8 schematically shows the transition of processes when the first processor 58*a*, the second processor 58*b*, . . . , and the Nth processor 58*n* of the contour search unit 56 perform contour search processes. A time axis is set in the right direction of the figure, and N processing units, the first processor 58*a*—the Nth processor 58*n*, execute from a time T1 the request for a search process for a knot 1, a knot 2, . . . , and a knot N of a given candidate curve. Upon reading the request for a contour search process from the contour search task queue 52, each processing unit copies the image data of the area specified by the request for a search process to local memory in the unit's charge from a contour image in the image storage unit 24. In FIG. 8, the time required for copying and the time required for searching are each represented by rectangles.

In the embodiment, by performing a pipeline process so that the copying of the area specified by a request for a search process subsequently read from the contour search task queue 52 is started while a search for a contour for a given knot is performed. In the example of the figure, the first processor 58a, the second processor 58b, . . . , and the Nth processor 58n respectively start copying the image data of the areas correspond to the knot 1, the knot 2, . . . , and the knot N at a time T1. At a time T2 when the copying is finished, a search for contour lines in the copied areas is started. The first processor 58a, the second processor 58b, . . . , and the Nth processor 58n start copying the search areas of a knot N+1, a knot N+2, . . . , a knot 2N for which a request for a search process is issued subsequent to the knot N at this time.

At a time T3 when the search process of the previous knots is finished and when the copying of the search areas of a subsequent knot is finished, a search for contour lines in the copied areas is started. Thereafter, the respective processors repeats the process of copying and searching for knots 2N+1–3N, knots 3N+1–4N, and onward so that the copying of a subsequent area is started during the search. In this manner, the time for the copying process due to parallelizing the search process can be controlled to be at a minimum, and the improvement of the processing speed by the configuration such as the parallel process and the high-speed access to the local memory can be effectively achieved.

In FIG. 8, the time required for copying and the time required for a search process are shown to be almost the same. However, the purpose is not to limit the embodiment to this. In other words, any embodiment can be employed where the copying of an area to be subsequently processed is started at anytime while a contour search process is performed on a given area, and a search process is performed on the area when both a previous search and the copying are finished. It is to be noted that if the time for copying and the time for a search process are almost the same as shown in FIG. 8, the overhead where a search process cannot be started while waiting for the completion of the copying can be absorbed. When continuously performing a contour search on all knots after copying the whole contour image, it first requires some time to copy large-size image data. Even when compared to this, processing time can be shortened in the above-stated configuration.

Therefore, the size of a search area may be adjusted so that the time required for copying and the time required for searching are almost the same. For example, before the actual tracking process, the required number of cycles for processes may be measured by performing experiments in search areas of different sizes by using a test image having similar image configuration so as to determine the size of an area to be cut so that the numbers of cycles for the processes are almost identical. By the contour image clipping unit 50 controlling the contour search unit 56 so that the contour search unit 56 actually performs a search process so as to acquire time required for copying and a search process, feedback control may be used so as to determine the most efficient size of a search area.

Similarly, the size of an area to be cut may be adjusted for a different perspective. For example, there is a situation where the amount of time that can be used for the observation of the likelihood is limited such as when an object in an on-camera image is tracked in real time. Under such a circumstance, as the number of target objects increases, the contour search for one knot needs to be further shortened. The time for both copying and conducting a search process can be shortened by adjusting the size of an area by performing experiments before the actual tracking process so as to reduce the size even in such a case. Alternatively, the size of a search area may be determined by preparing a table in which the optimal size of a search area is set for different numbers of target objects in advance so that the contour image clipping unit 50 refers to the table upon the acquisition of the number of target objects after the tracking is started.

A table for determining the size of a search area may be prepared in consideration of multilateral element, such as parameters that determine the ease of tracking, for example, the shape of a candidate curve, the complexity of the movement, and the contrast of an image, and required tracking accuracy, in addition to the number of target objects.

Figure 9:
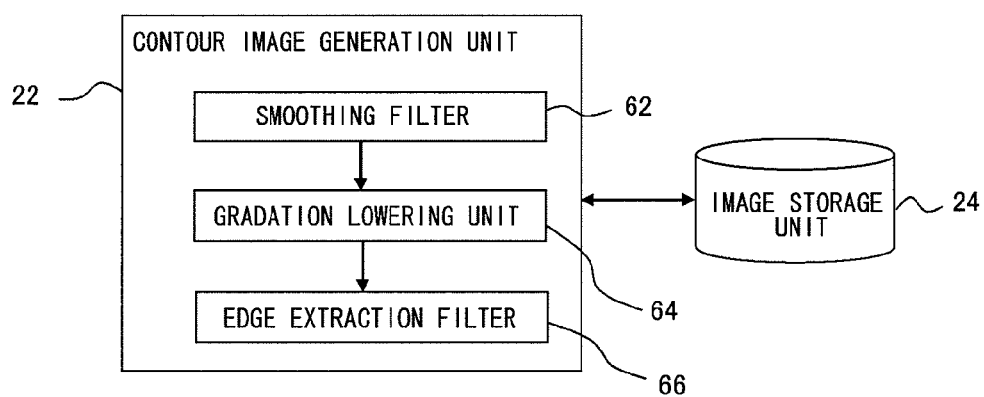
FIG. 9 shows the detailed configuration of a contour image generation unit in the embodiment 1.

A detailed description will be given of a generation process of a contour image by the contour image generation unit 22. FIG. 9 shows the detailed configuration of the contour image generation unit 22. The contour image generation unit 22 includes a smoothing filter 62, a gradation lowering unit 64, and an edge extraction filter 66. The contour image generation unit 22 generates a contour image by reading the image frame of an input image stored in the image storage unit 24 and having smoothing, gradation lowering, and edge extraction performed in said order respectively by the smoothing filter 62, the gradation lowering unit 64, and the edge extraction filter 66.

Figure 10:
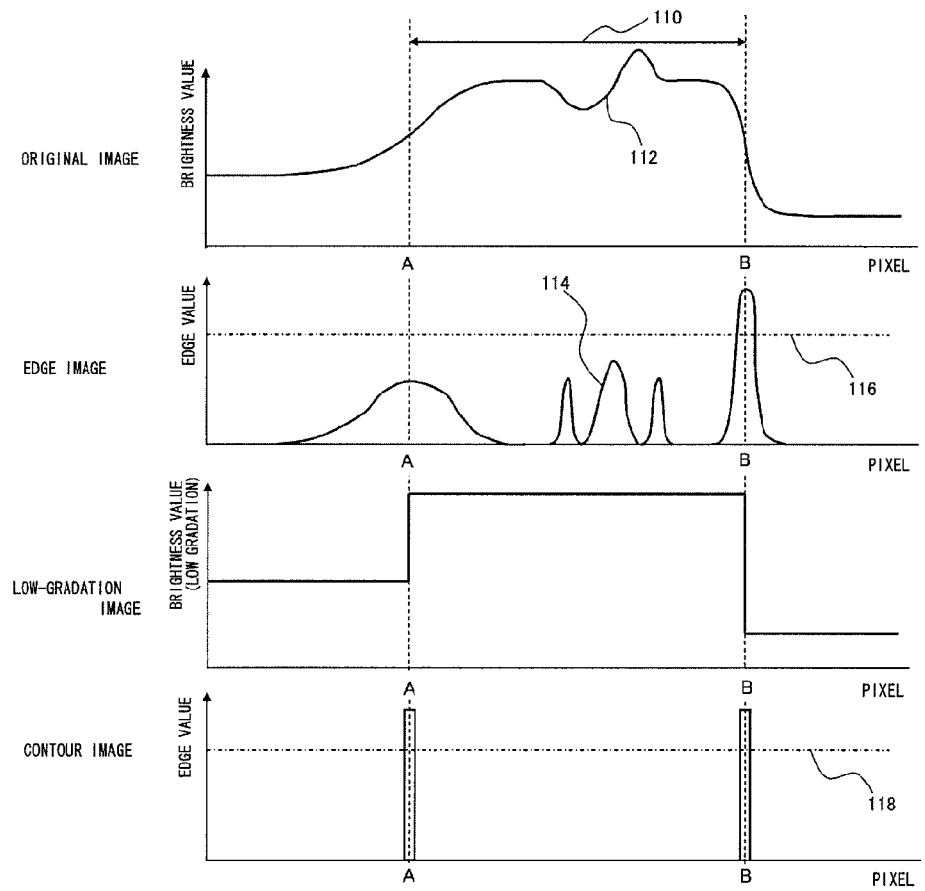
FIG. 10 illustrates the difference between a general edge extraction process and a contour image generation process in the embodiment.

The principle of the contour image generation unit 22 generating a contour image is as follows. FIG. 10 is a diagram illustrating the difference between a general edge extraction process and a contour image generation process in the embodiment. All the horizontal axes in the figure represent the positions of images, in other words, the lines of pixels, and have common ranges. The graph at the top represents the distribution of the brightness values of an original image, which is an input image. As an example, the figure shows rows of pixels where the images of target object are in a region 110 shown by an arrow and where the contours of the target object are at a pixel A and a pixel B.

Taking the distribution of the original image into consideration, the change in the brightness value near the pixel A is more gentle than the change in the brightness value near the pixel B with respect to the positions. This can happen quite often when the color of the target object and the color of the background are similar near the pixel A or when only the side of the pixel A is in the shade. In the region 110 of the image of the target object, the brightness value is also not constant due to the change in the color or due to the shade, and there is a variation of the brightness value such as an irregularity 112.

When generating the edge image of an original image that shows such a distribution of brightness values, an edge is generally extracted by filtering using an edge extraction filter such as a Laplacian filter. A threshold value is set for the magnitude of the change of the brightness value with respect to the image plane, and a part where a change exceeding the threshold value is observed is extracted as an edge. The second graph of FIG. 10 is a graph for when an edge image is generated in that manner. In other words, the magnitude of the change in the brightness value as shown in the graph is calculated as an edge value, and a part having an edge value exceeding a threshold value 116 set in advance, that is, a pixel near the pixel B is extracted as the edge.

In the example of FIG. 10, a pixel near the pixel A, which is the other contour, is not extracted as the edge since the edge value is smaller than the threshold value 116. In order to extract the pixel near the pixel A as an edge, the threshold value needs to be set to a small value. However, this will extract as an edge a part 114, which is not related to the contour, that has relatively large edge value due to the irregularity 112 of the brightness value. In the embodiment, a candidate curve is set for the contour of a target object, and the position of the target object is estimated by observing the likelihood by matching against an actual contour. Therefore, the existence of a part not to be extracted for a contour line or the extraction of many lines other than a contour line obviously lowers a tracking accuracy. Thus, in order to perform high-accuracy tracking, it is necessary to find the optimal value for the threshold value 116 so as to avoid above-mentioned situations. However, there can be a situation where there is no optimal value in the first place depending on an image, in addition to the situation where an optimal value varies for each image.

In the embodiment, by roughly perceiving an object as a plane rather than by using detailed information such as lines and gradations in an image, the "contour of the object" rather than the "edges in the image" is extracted. More specifically, as shown in the third graph of FIG. 10, a low-gradation image obtained by lowering the gradation of the brightness value of an original image is generated. To facilitate understanding, the brightness value of the original image is represented in three levels. Regardless of the change in the brightness value on the image plane, the brightness value in the region 110 where the target object exists changes in a discontinuous manner from the brightness value of other regions and becomes information indicating the existence of the target object as a region.

By filtering the low-gradation image with an edge extraction filter, edge values, which show up only at parts where the low-gradation brightness value is changed in a discontinuous manner, as shown in the fourth graph of FIG. 10 can be obtained. In the case of such edge values, protruding parts of edge values are definite, and it is thus not necessary to particularly optimize a threshold value 118. Thus, a contour image can easily be obtained.

In the configuration shown in FIG. 9, the contour image generation unit 22 first smoothes the image frame of an input image by a smoothing filter 62. As the smoothing filter 62, a general smoothing filter such as a Gaussian filter, a median filter, a simple-averaging filter, or a low-pass filter can be used. This removes extra high-frequency components so as to perceive the plane of an object as an area. Then, by using the gradation lowering unit 64, a low-gradation image as described above is generated. The gradation lowering unit 64 can be realized by a general bit shift operation. The brightness values are divided by a border set in advance, and the brightness values in each division are converted into one brightness value. The brightness values may be equally divided from the bottom, or a color histogram of the image frame may be made so that the brightness value, at which the numbers of pixels are equal when divided, is defined as a border. A general posterization method may be used. The number of gradations of a low-gradation image can be defined to be, for example, around 8-32 gradations.

The number of gradations of a low-gradation image may be reset according to a target object, the background, the contents and type of an image, etc. In this case, low-gradation images with various gradations are generated by using, for example, test images similar to an image for actual tracking, and gradations at which a contour image can be generated the most accurately or gradations at which tracking does not fail are obtained. Then, by filtering with the edge extraction filter 66 the low-gradation image obtained by the gradation lowering unit 64, a contour image is generated. As the edge extraction filter 66, a general edge extraction filter such as a Laplacian filter, a Sobel filter, or a Canny edge filter can be used. This allows a binary format image with different values for a contour part and for the other part to be obtained as a contour image.

Figure 11:
FIG. 11 illustrates an example of an original image to be processed.
Figure 12:
FIG. 12 shows an edge image generated for the original image of FIG. 11 by a general edge image generation method.
Figure 13:
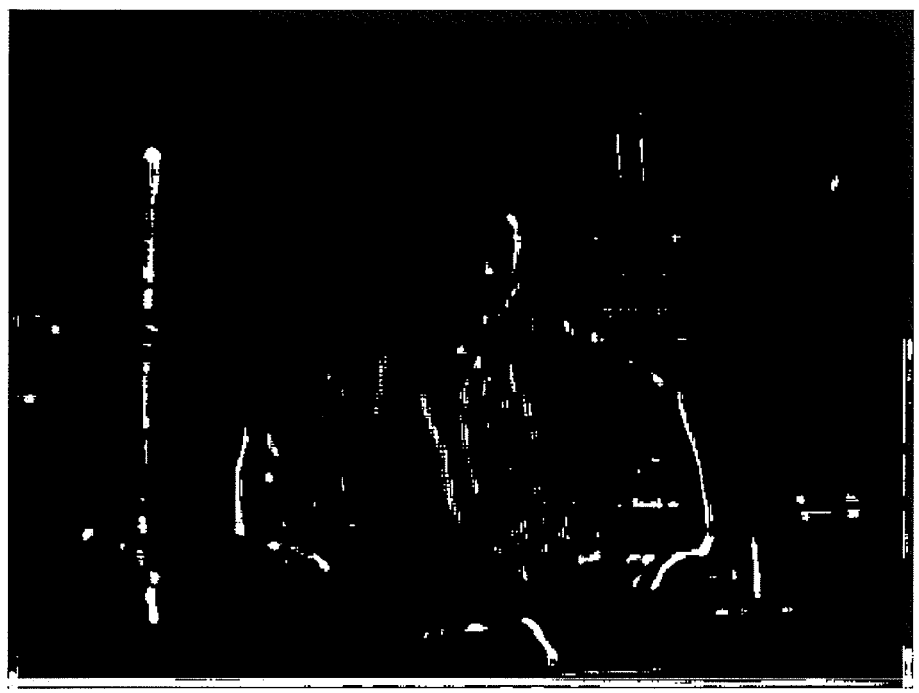
FIG. 13 shows an edge image generated for the original image of FIG. 11 by a general edge image generation method.

The result of applying the contour image generation method of the embodiment to an actual image is now shown along with a general edge image. FIG. 11 shows an example of an original image to be processed. FIGS. 12 and 13 show the results of generating edge images for the original image by a general edge image generation method. FIG. 12 is an edge image with a low threshold value, and FIG. 13 is an edge image with a high threshold value. In FIG. 12, many edges, in addition to the contour of a subject person, are extracted such as the pattern and wrinkles of his clothes and the parts of his face and are thus difficult to be distinguished from the contour. Edges are barely extracted for the left side of the person's head, which is a shaded part. When the threshold value is increased, only a few edges can be extracted, and the contour is barely extracted.

Figure 14:
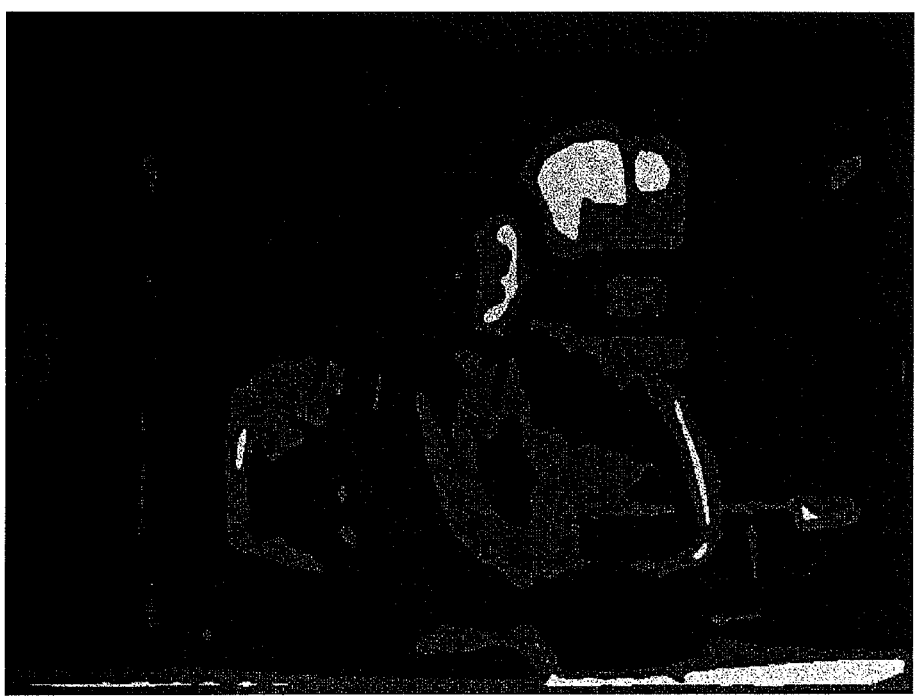
FIG. 14 shows a low-gradation image obtained as an intermediate image when a contour image generation process is performed on the original image shown in FIG. 11 in the embodiment 1.
Figure 15:
FIG. 15 shows a contour image generated by performing the edge extraction process on the low-gradation image of FIG. 14.

FIG. 14 shows a low-gradation image obtained by the smoothing filter 62 and gradation lowering unit 64 of the embodiment processing the original image shown in FIG. 11. As shown in the figure, in the low-gradation image, the detailed information such as the pattern of the clothes as seen in the edge image of FIG. 12 is omitted and the person and the objects are perceived as planes. FIG. 15 shows a contour image generated by performing the edge extraction process on the low-gradation image by using the edge extraction filter 66. In the figure, the contours of the person and objects are represented by almost continuous lines, and a contour line is extracted for the left side of the person's head, which is not extracted in FIG. 12.

The embodiment is mainly directed to tracking the movement of a person or an object in an image. Therefore, the movement of a target object can be accurately detected without switching or losing the target object by retrieving the information on the existence and position of a contour line in priority to the detailed information of the image at a pixel level. The process of gradation lowering serves the purpose of dividing an image roughly into areas based on the brightness values. The boarders of the areas produced are perceived as contours. Thus, the lines are hardly interrupted in the middle allowing for an easy search.

General edge images often have edge values shown with ranges having pixels that exceed threshold values. As shown in the second graph of FIG. 10, this is due to a regular edge value changing almost continuously in many levels and reaches, having a given range, its peak. In addition, the lower threshold value 116 is set in order to extract edges without fail, the broader the ranges of the extracted edges become. On the other hand, in the contour image of the embodiment, the gradations of even the pixels next to one another greatly vary, and the edge value reaches its peak at one pixel. Thus, the extracted parts are defined in pixel units, and the extraction results are shown in lines as a result. When an edge has a certain width, a process of thinning the edge is necessary for matching against a candidate curve. However, such a process is not necessary for the contour lines in the embodiment, allowing for a high-speed tracking process by having a simpler configuration.

According to the above-described embodiment, in observing the likelihood of each particle in a visual tracker in which a particle filter is used, focusing on the knots of a candidate curve defined by the particle, contour search processes are divided for each knot and then assigned to multiple processors so that the processes are processed in parallel. The contour search processes are independent for each knot. Thus, the assignment to processors and combining results are easy. The image data necessary for a contour search process for one knot is that of a limited area near the knot. Thus, the data size is small, and processors can perform contour search processes by copying the data to local memory. Therefore, high-speed access to contour image data can be achieved, and the processing speed can be further improved.

Cutting an area having a size possible to be copied from the contour image of an original video to local memory allows for the application to an information processing apparatus having a structure on condition that a process is performed by copying data to each core as it is in a heterogeneous multicore. This allows even a tracking process particularly for a high-quality image such as a high-definition video to be processed at high speed regardless of the structure of an apparatus.

For example, when dividing search processes for each target object and processing the divided processes in parallel, the number of necessary processors varies depending on the number of target objects; thus, the processing capacity of an apparatus cannot be fully used when the number of target objects is smaller than the number of processors. Contrarily, when the number of target objects is larger than the number of processors, a part of processes that cannot be assigned needs to be performed later. As a result, the processing capacity may not be fully used, either. Depending on the size of a target object, the size of image data necessary for each search process varies. Thus, both a shortage in a memory capacity and a change in a data transferring time are possible. As described above, a major change in a processing time or in a necessary memory size changes, depending on the contents of an input image, can result in lacking the versatility in addition to becoming a hindrance for determination of the specifications of an apparatus.

On the other hand, in the embodiment, search processes are divided for each knot so that the granularity of a processing unit becomes fine and that the number of processing units becomes large, and the change in a tracking condition such as the number of people to be tracked or the size of a tracking object thus has less effect on the processing time or on the necessary memory size, allowing for the easy estimation of parameters thereof. Therefore, the specifications of an apparatus can be easily determined, and a tracking process can be performed in a preferred environment regardless of the contents of an input image. Similarly, a parallel process is made possible by using a similar processing procedure regardless of the number of processors, and processing units of at least thousands of orders are generated for a frame, allowing for high scalability resulting from the easy assignment to each processor and from a relatively short amount of time required for one processing unit to finish.

A processing unit is defined to be search processes for each knot, and there is thus no dependency relation among the processing units, allowing for a pipeline process so that copying the area to be subsequently processed is started while a contour search process is performed for a given knot. This allows the time for copying to local memory to be included in the time for a search process. Combined with the parallelization of processes, this allows for faster processing. In particular, by changing the size of the area to be cut from a contour image, the amount of time required for copying, the amount of time required for a search process, and the balance between the two can all be adjusted. Thus, the intentions of a user, such as determining which of the tracking accuracy and the processing time shall be prioritized, can be easily reflected.

Furthermore, in generating a contour image, the plane of a target object is divided into areas by roughly perceiving the plane by smoothing and lowering the gradation of an original image. Then, the edge extraction follows. This allows for the extraction of the borders between planes as contour lines. In a general edge extracting process, there are frequent occasions where unnecessary edges other than the ones for contour lines are extracted and where contour lines are interrupted, both depending on a threshold value for the extraction, which affect the tracking accuracy. In the embodiment, as described above, the acceptable range of a threshold value is wide since the borders between planes are enhanced, and contour lines are thus easily enhanced.

By smoothing an image as a pretreatment before lowering gradation, information effective for the perception of a plane can be extracted, and a low-gradation image can be more accurately generated allowing for generating a highly-precise contour image. For example, as stated above, any of a smoothing filter, a gradation lowering unit, or an edge extraction filter, which are used for the generation of a contour image, can be processed by a raster scan, and the process is independent for each line, allowing for a high-speed processing. Furthermore, since the contours of the contour images generated in the embodiment are expressed in lines having a width of one pixel, a thinning process for the observations of the likelihood is not necessary.

Embodiment 2

In order to perform a visual tracking by using an above-stated particle filter with high accuracy by the visual tracking system 10, properly obtaining the contour line of a target object as an edge image is important. Preferably, the initial placement of a candidate curve and a motion model are not dissociated from the actual position and movement of a tracking object. However, the optimal edge extraction condition changes in accordance with the brightness of an input image, and the position and movement of a target object can vary greatly for different target objects. In this background, the edge extraction condition, the initial placement of a candidate curve, internal parameters of a motion model, etc., are adjusted by using the actual input image so that a tracking process is performed at the right condition under any environment in the visual tracking system 10 of the embodiment.

Figure 16:
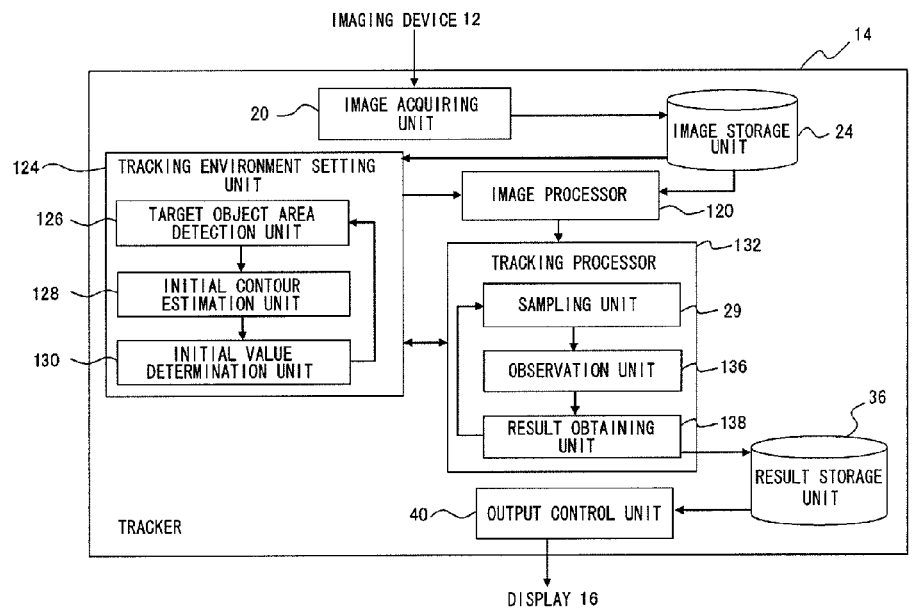
FIG. 16 shows the detailed configuration of the tracker according to the embodiment 2.

FIG. 16 shows the detailed configuration of the tracker 14 according to the embodiment. Like numerals represent constituting elements having like functions in the embodiment 1, and the description thereof is appropriately omitted. The tracker 14 comprises an image acquiring unit 20 that acquires the input image data input by the imaging device 12, an image storage unit 24 that stores the input image data, a tracking environment setting unit 124 that detects a target object and adjusts various parameters, an image processing unit 120 that generates an edge image from the input image data, a tracking processing unit 132 that performs the tracking process by using a particle filter, a result storage unit 36 that stores the final tracking result data, and an output control unit 40 that controls the output of the tracking result data to the display 16.

In FIG. 4, the components described as functional blocks that perform various processes are provided by hardware such as CPU, memory, and other LSI, or by software such as image processing programs and the like. Therefore, it will be obvious to those skilled in the art that the functional blocks may be implemented in a variety of manners by a combination of hardware and software.

The tracking environment setting unit 124 includes a target object area detection unit 126, an initial contour estimation unit 128, and an initial value determination unit 130. The tracking environment setting unit 124 detects a target object included in an input image and adjusts various parameters necessary for the tracking processing unit 132 to perform a tracking process by using the input image. With regard to the parameters adjusted by the tracking environment setting unit 124, the set values thereof affect the accuracy or efficiency of tracking, and the optimal values thereof change according to the image-capturing environment of the input image or a target object. For example, as described above, such parameters include: a parameter for edge extraction, which is an extraction condition when generating an edge image; the range for the initial value of a shape-space vector x; and an internal parameter for a motion model. Hereinafter, such parameters are referred to as "environment-dependent parameters."

A parameter for edge extraction included in environment-dependent parameters changes the density of an edge in an edge image. For example, the parameters include the size and the standard deviation of a kernel when a Gaussian filter is used in an image smoothing process before the extraction of an edge. Preferably, an edge image shows only the contour lines of a target object in a continuous manner. The possibility of failing the edge search becomes larger when too little line is expressed as the edge, and the degree of the reliability of the likelihood decreases due to the matching with lines other than the contour lines when too many lines are expressed.

The range of the initial value of the shape-space vector x is a range for placing a particle, to be transited when obtaining the probability density distribution for the first time, in a parameter space. When the candidate contour expressed by a particle is completely different from the position and size of a target object, the likelihood of the particle is observed to be low as a matter of course. Instead of generating such particles in the first place, placing particles only close to the target object allows for a highly accurate tracking process to be performed from the start of the tracking.

The optimal value of the internal parameter of a motion model changes depending on, for example, the distance the target object moves between frames. For example, such internal parameters include the standard deviation of Gaussian distribution in the case of applying a Gaussian motion model. Decreasing the standard deviation when a target object barely moves and increasing the standard deviation when the target object moves to a great extent allow particles to be transited only to the range with the high possibility while completely covering the movement of the target object. Thus, the particles can be efficiently used.

The environment-dependent parameters are not limited to the above-stated parameters and may be determined as appropriate depending on an edge extraction method or a motion model as long as the parameters are to be used for generating an edge image or performing a tracking process. For example, the environment-dependent parameters may include the final number of gradations when performing a gradation lowering process of an image at the time edges are extracted and may include, when making a correction on the observed likelihood using some sort of standards, the standards. A detailed description will be given of the gradation lowering and making correction on the likelihoods.

The target object area detection unit 126 detects the area for a target object by performing image analysis for every image frame of input image data stored in the image storage unit 24 and determines whether to start or to stop the tracking. For example, the target object area detection unit 126 includes a foreground extractor (not shown) in which a background difference is used, determines the presence of a target object from the shape of foreground extracted from the image frame, and detects the area. If a target object is the head of a person, a face detection technique may be further applied. Alternatively, an area having a color different from the background or having a specific color may be detected as a target object by a color detector. The area of a target object may be detected by pattern matching against the shape of a target object set in advance.

Furthermore, in addition to the imaging device 12, the visual tracking system 10 may be provided with a temperature sensor that measures the heat distribution of the space of an object whose image is to be captured or with a piezoelectric sensor that acquires the contact area of a target object in a two dimensional manner so as to detect the area of the target object by the heat distribution or the pressure distribution. Existing techniques can be applied for the detection of a target object by a temperature sensor or a piezoelectric sensor.

Upon the detection of the area of a target object, the target object area detection unit 126 determines that the tracking has been started and acquires predetermined information (hereinafter, referred to as a "feature amount") that shows the characteristics of the detected area. For example, when detecting the area of a target object by a foreground extractor, the center of gravity position of the area, the range where the area exists in the image, and the inclination of the area are obtained as a feature amount since the contour line of the target object is acquired. In addition to those stated above, for example, the color histogram, the texture, and the heat distribution of the area may be defined as a feature amount and may be determined as appropriate according to the detection method of the area of the target object. The feature amount is used for the adjustment of the environment-dependent parameters.

The stopping of the tracking determined by the target object area detection unit 126 may include suspension of tracking due to occlusion. The tracking is determined to be started, for example, when the target object appears in the viewing angle of the imaging device or appears from behind something. The tracking is determined to be stopped, for example, when the target object passes out of the viewing angle of the imaging device or hides behind something.

After temporarily setting each environment-dependent parameter, the initial contour estimation unit 128 estimates the contour of a target object by using a particle filter by a processing procedure similar to the above-mentioned general visual tracking method. More specifically, an edge image of the input image of a target object is generated by using a temporarily-set parameter for edge extraction, and the particles are equally placed within a temporarily-set range of the initial value of a shape-space vector x. The placed particles are then transited by a motion model, to which the internal parameters of the temporarily-set motion model are applied, for example, by a Gaussian motion model, and the likelihood is observed by using the generated edge image. Based on the result, the probability density distribution is computed, and the contour is estimated.

The initial value determination unit 130 compares the feature amount obtained from the contour of the target object estimated by the initial contour estimation unit 128 and the feature amount of the area of the target object detected by the target object area detection unit 126 and evaluates the degree of matching. If the degree of matching does not satisfy the condition that is set in advance, the resetting of parameters and the contour estimation of the target object are requested to the initial contour estimation unit 128.

The feature amount to be compared by the initial value determination unit 130 are the feature amount of the areas of the same parts of the area of the target object. For example, when tracking the person 152 in the person image 150 shown in FIG. 1, the tracking is carried out by expressing the shape of the head by an ohm-shaped curve 154. Thus, the contour estimated by the initial contour estimation unit 128 is the contour of the head. Therefore, the target object area detection unit 126 acquires the feature amount for the part of the head from the area of the target object, that is the area constituted by the body of the person 152.

Alternatively, the positional relation of the head and the other parts may be defined in advance, and the area of a specific part may be derived from the estimated contour. For example, by estimating the contour of the head and then deriving the area of the upper body based on the estimated contour, the estimated feature amount of the upper body and the actual feature amount of the upper body detected by the target object area detection unit 126 may be compared.

The calculation method of the degree of matching of feature amounts varies from feature amount to feature amount as a matter of course. For example, scales are set in advance according to each feature amount, such as the distance between the centers of gravity, the position and size of a rectangle circumscribed on the area, and histogram intersection when a feature amount is determined to be the center of gravity, the range of an area, and color histogram, respectively. When calculating the degree of matching for multiple feature amounts, the degree of matching for each feature amount is comprehensively evaluated according to rules set in advance, by assigning points or assigning weights.

When the degree of matching of the feature amount obtained from the contour estimated by the initial contour estimation unit 128 and the feature amount of the area of the target object detected by the target object area detection unit 126 reaches or exceeds a reference value, the initial value determination unit 130 determines the value of the environment-dependent parameter at that point as a final set value. A parameter for edge extraction included in the environment-dependent parameters is transmitted to the image processing unit 120. The parameters necessary for the transition and observation of particles, such as the internal parameters of a motion model or the correction reference of the likelihood, are transmitted to the tracking processing unit 132. The probability density distribution calculated by the initial contour estimation unit 128, when estimating the contour, is also transmitted to the tracking processing unit 132 so as to be used for the generation and elimination of particles at a subsequent time.

In the example described above, upon the new detection of a target object by the target object area detection unit 126, an environment-dependent parameter is set. However, even when the tracking processing unit 132 is in the process of tracking a given target object, the feature amount of the actual target object and the feature amount of the estimated contour may be constantly compared. The environment-dependent parameter may be reset using a similar method when the degree of matching of feature amounts falls below the reference value. In this case, the result obtained by the tracking processing unit 132 can be used for the feature amount of the estimated contour. Updating the set value of the environment-dependent parameter at any time allows the high tracking accuracy to be maintained not only when the tracking is started but also when a tracking object is moved or when the brightness of an image changes due to the change in the environment such as a change in the weather or the opening of curtains.

The image processing unit 120 generates an edge image from an input image. More specifically, by using the parameter for edge extraction acquired from the tracking environment setting unit 124, an edge extracting process is performed for each image frame of the input image data stored by the image storage unit 24. Any general smoothing filter such as a Gaussian filter, a median filter, a simple-averaging filter, or a low-pass filter and any a general edge extraction filter such as a Laplacian filter, a Sobel filter, or a Canny edge filter can be used. The image processing unit 120 may efficiently extract the contour line of a target object by acquiring the data of the foreground from the target object area detection unit 126 and then performing an edge extracting process only on the foreground.

As described earlier, the edge images in the embodiment are generated in order to obtain the contour lines of target objects. However, depending on an image or on the condition for edge extraction, it is possible that a part, for which a contour line is not extracted as an edge, exists or that many lines other than a contour line are extracted. In order to prevent the occurrence of such situations, the image processing unit 120 may have the same configuration as that of the contour image generation unit 22 of the embodiment 1, and a process of gradation lowering, in addition to the processes performed by a smoothing filter and an edge extraction filter, may be performed. For example, an input image is smoothed by a smoothing filter, and the edge extraction filtering is then performed after the gradations of the input image is lowered to be around 8-32 gradations.

Lowering the gradation of an image before the extraction of the edge allows the brightness value of the area of a target object to be changed from the brightness value of the other area in a discontinuous manner; thus, the area of the target object can be expressed as a plane. This allows for the easy extraction of the contour line by an edge extraction filter even when there is not much variation in the brightness values at the contour line in an original image. The gradation lowering can be realized by a general bit shift operation. The brightness values are divided by a border set in advance, and the brightness values in each division are converted into one brightness value.

The brightness values may be equally divided from the bottom, or a color histogram of the image frame may be made so that the brightness value, at which the numbers of pixels are equal when divided, is defined as a border. A general posterization method may be used. When a gradation lowering process is performed in generating an edge image, the final number of gradations may be included in environment-dependent parameters as described above.

On the other hand, the image processing unit 120 may extract the contour of a target object by a method other than the above-stated edge extraction methods. For example, the curve that constitutes the periphery of the foreground may be extracted as the contour, or multiple methods may be combined. In the following explanation, all the contours including the ones extracted by such methods are included as "edges." Therefore, an "edge image" generated by the image processing unit 120 is used synonymously with a "contour line extraction image."

The tracking processing unit 132 includes a sampling unit 29, an observation unit 136, and a result obtaining unit 138. The function of the sampling unit 29 is as explained in the embodiment 1.

As already described, the observation unit 136 applies a motion model to all of the particles so as to cause the particles to make a transition in the parameter space and observe the likelihood of the candidate curves defined by the particles. The internal parameters of the motion model and the initial probability density distribution acquired from the tracking environment setting unit 124 are used.

The observation unit 136 may make corrections according to the rules set in advance for the obtained likelihood. For example, due to edges accidentally existing in the proximity, a high likelihood can be observed even for a candidate curve with a shape that differs greatly from the actual target object. A correction is made on such a likelihood so as not to adversely affect the calculation of the probability density distribution. For example, an acceptable range is set for the size or aspect ratio of an estimated contour, and a correction is made to decrease the likelihood at a predetermined rate when the likelihood of an estimated contour, whose size or aspect ratio goes beyond the acceptable range, exceeds a predetermined threshold value. In the case of making such a correction, an acceptable range to be set can be included in environment-dependent parameters.

The result obtaining unit 138 has a function similar to that of the result obtaining unit 38 in the embodiment 1. When updating at any time the parameters set by the tracking environment setting unit 124, the result obtaining unit 38 further transmits the data of an estimated contour of a target object to the tracking environment setting unit 124.

By performing the aforementioned processes by the image processing unit 120 and the tracking processing unit 132 for each frame, the result storage unit 36 is capable of storing, for example, the data for a moving image that includes the tracking result. In this case, the template curve may be shown moving in association with the movement of the target object by outputting the data for moving image to the display 16 under the control of the output control unit 40. As described above, in addition to being displayed in the form of a moving image, the tracking result may be, for example, output to another operation module depending on the purpose of tracking.

The operation of the tracker 14 in the tracking process is described below. Hereinafter, tracking of a person at a certain location will be described by way of example. The imaging device 12 captures an image of the target place at a predetermined frame rate. The captured image is input into the image acquiring unit 20 of the tracker 14 as input image data and is then stored in the image storage unit 24. The tracking process as described below will then be performed.

Figure 17:
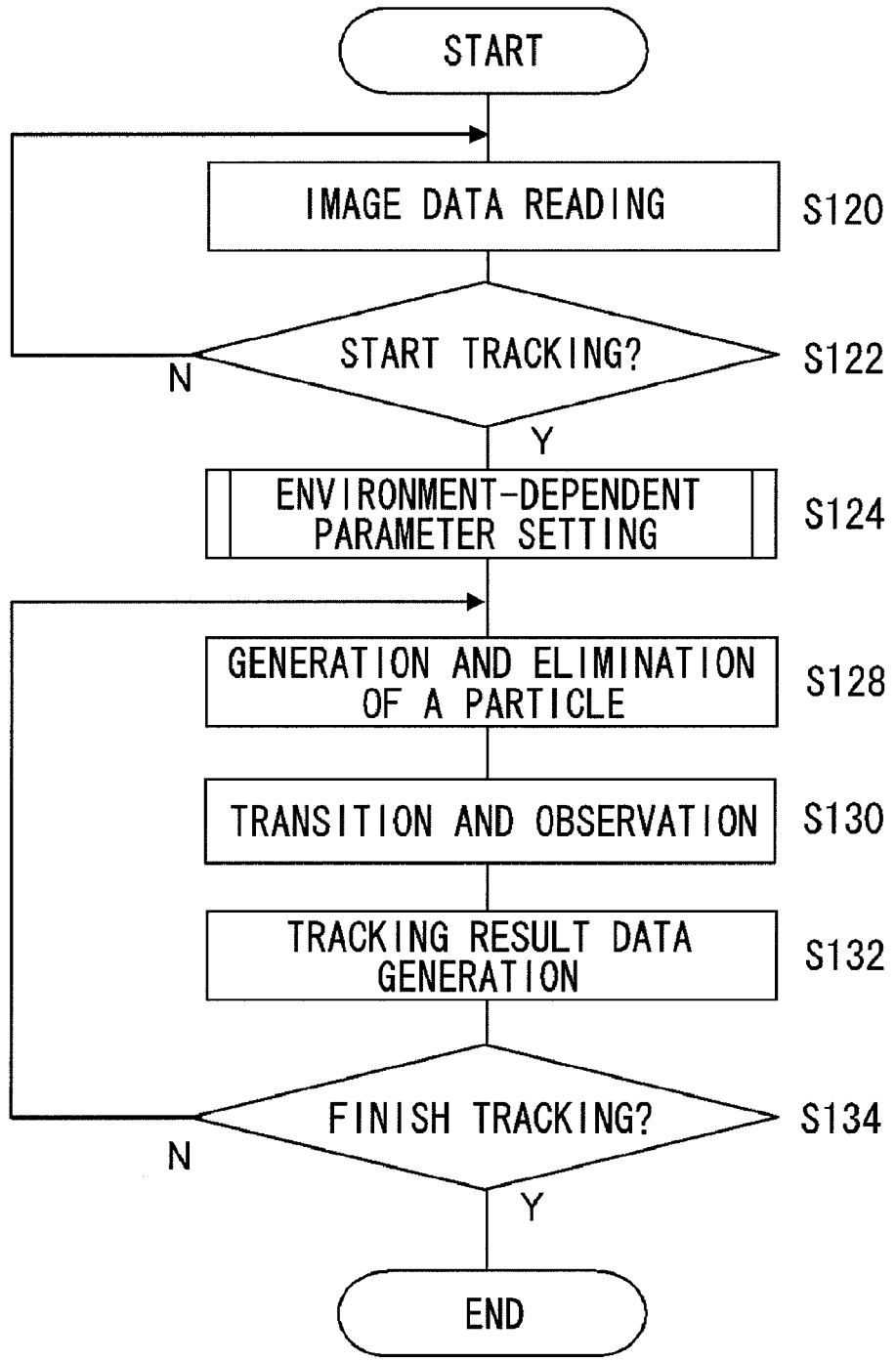
FIG. 17 is a flowchart showing the sequence of the tracking process according to the embodiment 2.

FIG. 17 is a flow chart showing the tracking process according to one embodiment of the present invention. Since the target object is a person, the template for an ohm-shaped curve is provided in the tracker 14 as previously described. The template may be described by other representations that can describe a desired curve, instead of the B-spline curve. Also, the template shape may be transformed by any method that is compatible with the template's description format and that flexibly transforms the shape by changing several types of parameters as mentioned above.

First, the target object area detection unit 126 of the tracking environment setting unit 124 reads the input image data stored in the image storage unit 24 for each frame to determine whether to start tracking (S120, S122). For example, when a foreground object extracted from an image frame matches an object having a predetermined size and shape by which a person is identified, the target object area detection unit 126 determines to start tracking. The foreground size and shape being the criteria for determining a match may be determined in either a logical or experiential way. In addition to the extraction of a foreground, a known method may be used for the detection of a person, such as color detection, pattern matching, face detection, heat distribution detection, and contact area detection, as described above.

Steps S120 and S122 are repeated until the tracking is determined to start. When the tracking is determined to start (S122: Y), the tracking environment setting unit 124 adjusts the environment-dependent parameters, acquires the optimal values, and then sets them for the image processing unit 120 or the tracking processing unit 132 (S124). A detailed description is given of the processing procedure of setting environment-dependent parameters, in reference to FIG. 18.

Using the probability density distribution $p(x_0^i)$ acquired by the tracking environment setting unit 124 in determining an environment-dependent parameter, the sampling unit 29 then produces particles (S128). In this instance, the image frame at the time the tracking starts is assumed to occur at time t=0. Subsequent image frames are assumed to occur at time t=1, 2, 3, . . . , respectively.

The observation unit 136 then causes the particles to make a transition based on a predetermined motion model and observes the likelihood $p(y_t|x_t^i)$ of the candidate curves defined by the particles after the transition (S130). The values determined by the tracking environment setting unit 124 are used for the internal parameters that define a motion model. Observation of the likelihood is performed by searching for edges in the neighborhood of the candidate curves, using the edge image at time t=1 generated by the image processing unit 120. Edges may be searched for using a generally used method in the condensation algorithm or the like.

The result obtaining unit 138 determines the probability density distribution $p(x_1^i)$ at time t=1 based on the observed likelihood. If there is a plurality of target objects, the above-described process is performed for each target object. The result obtaining unit 138 determines the shape and position of the target object at time t=1 by ultimately identifying the ohm-shaped estimated contour obtained by weighting the parameters by the probability density distribution $p(x_t^i)$ and then averaging the weighted parameters. The result obtaining unit 138 also generates desired tracking result data by, for example, generating image frames superimposed on the original input image frame and stores the resultant data in the result storage unit (S132).

The target object area detection unit 126 determines whether to continue furthermore or to stop the tracking process (S134). For example, when a predetermined time has elapsed in the state where there is no foreground object having a predetermined size and shape by which a person is identified, the tracking start-and-stop determining unit 28 determines that the tracking process should stop. The target object area detection unit 126 also includes a timer (not shown) to measure time elapsed from the disappearance of the foreground objects. For example, the stopping of tracking is determined immediately after a flag is raised when a predetermined time, being based on experimental data and the like, has elapsed.

When the continuation of the tracking process is determined in S134 (S134:N), the sampling unit 29 creates or eliminates particles to perform sampling on the image frame at timestep t=2 using the probability density distribution $p(x_1^i)$ at timestep t=1 obtained in S132 (S128). The processes of S128 to S132 are repeated for each frame until the target object area detection unit 126 makes a determination to stop tracking (S134:N). Accordingly, video data in which an ohm-shaped curve changes its motion and shape over time while following those of the visitor's head, being the target object, is stored in the result storage unit 36. The output control unit 40 outputs the video data to the display 16, or to a module providing other functions and the like, thereby enabling the user to use the tracking result as desired.

Figure 18:
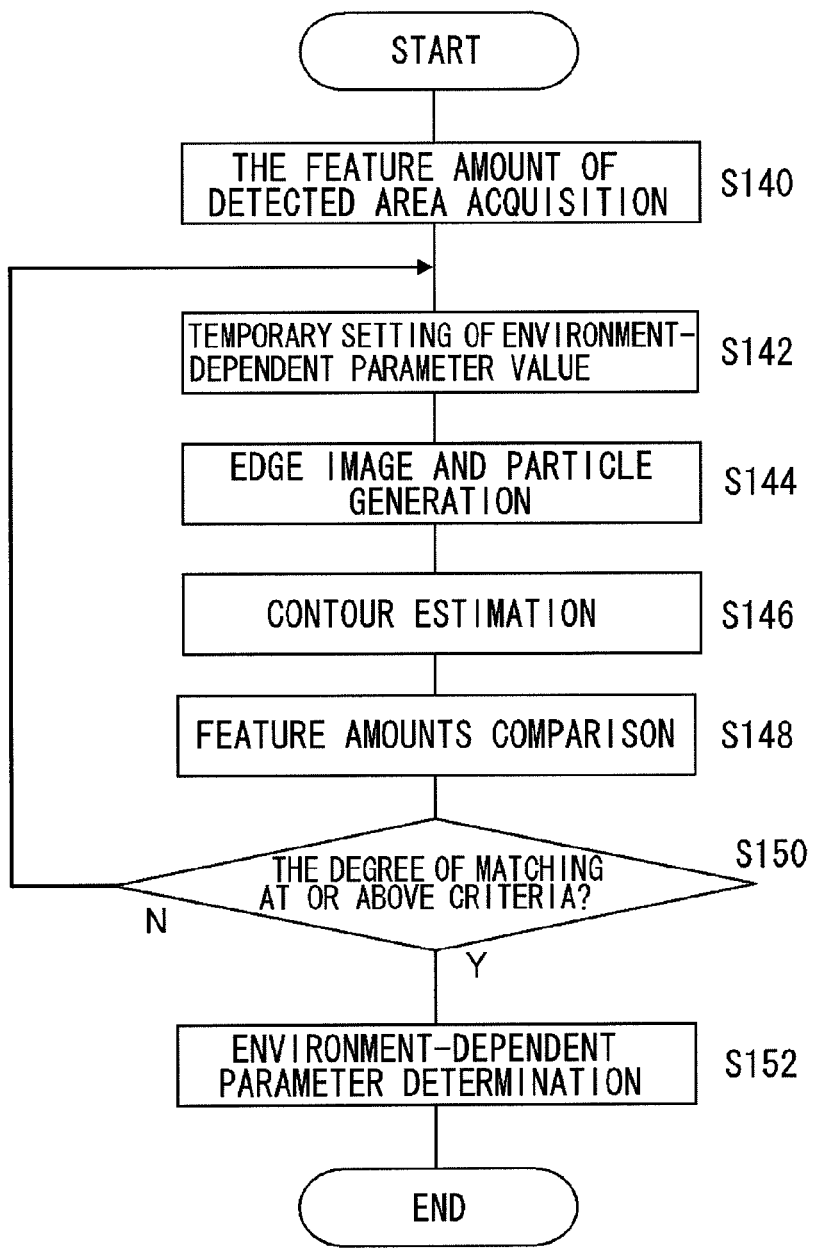
FIG. 18 is a flowchart showing the processing procedure of the setting of an environment-dependent parameter in the embodiment 2.

FIG. 18 is a flowchart showing the processing procedure of the setting of an environment-dependent parameter in S124 in FIG. 17. The target object area detection unit 126 acquires the feature amount of the area of a target object detected by the target object area detection unit 126 itself, such as the center of gravity, the size, and the inclination (S140). As stated previously, the feature amount includes the color histogram, the texture, and the heat distribution of the area of a target object according to the detection method of the target object or according to the target object. On the other hand, the initial contour estimation unit 128 temporarily sets the value of each environment-dependent parameter (S142). The value to be set at this time may be set in advance for each environment-dependent parameter as described later.

By using a temporarily-set parameter for edge extraction, the initial contour estimation unit 128 generates an edge image from the image for which tracking is determined to start and generates particles within a temporarily-set range of the initial value of shape-space vector x (S144). The particles are transited by the motion model defined by the temporarily-set internal parameter, and the contour is estimated by obtaining the probability density distribution by observing the likelihood with the use of the edge image generated in S144 (S146).

The initial value determination unit 130 compares the feature amount obtained from the contour estimated in S146 by the initial contour estimation unit 128 and the feature amount of the area of the target object acquired in S140 by the target object area detection unit 126 and checks the degree of matching for the two (S150). When the degree of matching is smaller than the reference value (S150:N), the current value of the environment-dependent parameter is determined to be improper, and the initial contour estimation unit 128 is requested to reset the temporarily setting of the value of the environment-dependent parameter (S142). When the degree of matching is greater than the reference value (S150:Y), the temporarily-set environment-dependent parameter is determined to be proper, and the value of the environment-dependent parameter is determined to be the final value (S152).

In the above example, the degree of matching of the feature amount of an image at a time t=0 is compared; however, the degree of matching may be checked for multiple image frames. In this case, in the similar process performed by the tracking processing unit 132, the generation and the elimination of the particles are performed by using the probability density distribution at the previous timestep, and the contour of the subsequent timestep is estimated by the transition and observation. Then, a comparison is made with the feature amount of the area of the target objet at the subsequent timestep. In this embodiment, the accuracy of an estimated contour can also be evaluated for the movement of a target object, and the reliability of set environment-dependent parameters are thus increased, and the motion model to be applied can be also included in the environment-dependent parameters.

Figure 19:
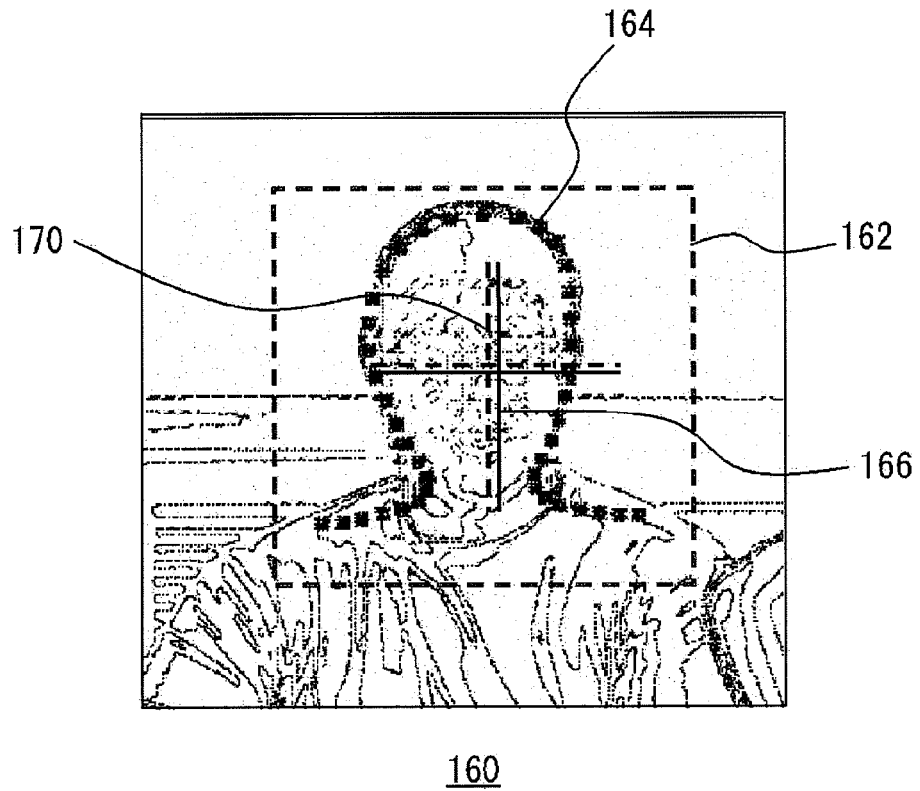
FIG. 19 schematically shows a tracking environment setting unit determining the environment-dependent parameter in the embodiment 2.

FIG. 19 schematically shows the tracking environment setting unit 124 determining the environment-dependent parameters. An edge image 160 is generated in S144 by using the temporarily-set parameter for edge extraction in S142 in FIG. 18. An area 162 is a range for placing a contour curve defined by each particle when the particle is generated in S144. It is assumed that the range is a rectangle including, for example, an area obtained by multiplying by a constant number the area of a target object detected by the target object area detection unit 126. The shape-space vector x is temporarily set in consideration that each candidate curve is positioned in the area 162.

The contour estimated by using the particle generated in this manner in S146 in FIG. 18 is an ohm-shaped estimated contour 164. If the center of gravity of the facial area of the target object acquired by the target object area detection unit 126 in S140 is at the intersection point of dashed lines 170, and if the center of gravity of the facial area based on the estimated contour 164 obtained by the initial contour estimation unit 128 in S146 is at the intersection point of solid lines 166, it is determined that the currently calculated probability density distribution is close to the actual value, that is, the current temporary value of the environment-dependent parameter is proper as the intersection points of the both are close to each other as shown in the figure.

The value of the environment-dependent parameter needs to be sequentially changed until the degree of matching reaches the criteria in S150 in FIG. 18. For example, a temporary setting is carried out at the values of 3×3, 5×5, 7×7, and 9×9 for the size of the kernel of a Gaussian filter. The temporary setting is made at 0.01-10.0 for the standard deviation of the kernel and any bit from 1-7 bits for the color information at the time of the gradation lowering process if the original image has 8-bit color. Two or more environment-dependent parameters may be changed at the same time. For example, a table listing the combinations of the standard deviations and sizes of the kernel is prepared, and the both values are changed according to the table at the time of adjustment.

Figure 20:
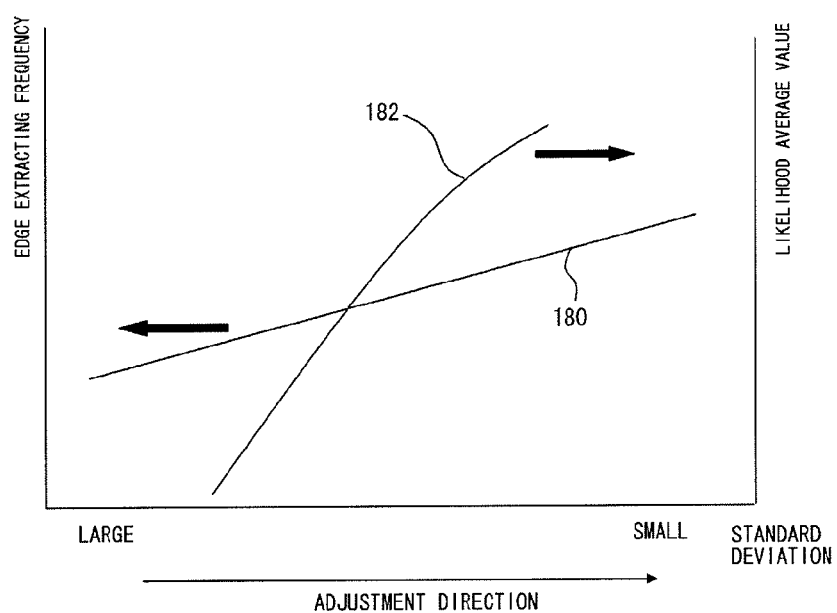
FIG. 20 is a view for the illustration of a setting order when the environment-dependent parameter is temporarily set by the tracking environment setting unit of the embodiment 2.

An efficient adjustment can be carried out by properly determining the setting order along with the temporarily set values. FIG. 20 is a view for the illustration of the setting order when the environment-dependent parameter is temporarily set by the tracking environment setting unit 124. The figure shows as an example the case where the standard deviation of the kernel in Gaussian filter is set. When the horizontal axis and the vertical axis are determined to be the standard deviation and the edge extracting frequency, respectively, the relationship between the two are as shown by a line 180. As the standard deviation becomes larger, the edge extracting frequency becomes smaller, and as the standard deviation becomes smaller, the edge extracting frequency becomes larger. The edge extracting frequency represents the ease of extracting an edge. For example, when extracting the area where the ratio of the change in a pixel value is at the threshold value or more, the edge extracting frequency becomes larger as the threshold value decreases.

On the other hand, when the edge extracting frequency changes as the line 180 changes, the number of edges detected near the candidate curve defined by each particle and, furthermore, the average value of the likelihood changes as a line 182 changes. In other words, when the edge extracting frequency is small and there is almost no edge in an edge image, the average value of the likelihood is small since edges hardly exist near the candidate curve, and when the edge extracting frequency becomes larger, the density of edges become larger, and the average value of the likelihood becomes larger. However, as the edge extracting frequency becomes larger, many edges other than the contour of the target object are included in the edge image, and the reliability of the likelihood thus decreases.

As described above, the edge extraction is preferably carried out at the minimum extracting frequency for the contour line of a target object to be extracted as an edge. In order to efficiently find the standard deviation to obtain the appropriate extracting frequency, the temporary setting is made in the direction of the arrow below the graph in the figure, in other words, in decreasing order the standard deviation. Changing the standard deviation in this manner monotonically increases the edge extracting frequency. In this way, the degree of matching of the feature amount exceeds the criteria at an appropriate edge extracting frequency before the reliability of the likelihood decreases, and the optimal value of the standard deviation can be obtained.

The above is an example of the standard deviation; however, the same applies to the other parameters for the edge extraction. For example, when lowering the gradation of an image at the time of edge extraction, the edge extracting frequency monotonically increases by setting a final number of gradations in increasing order. Even when the edge extracting frequency does not monotonically change when the parameter for edge extraction is changed, the order such that the edge extracting frequency monotonically increases is obtained in advance. The same applies to the case where multiple parameters are set at the same time.

According to the above-described embodiment, in visual tracking where a particle filter is used, the adjustment is carried out, by using the actual input image, of environment-dependent parameters: a parameter for edge extraction; the range for the initial value of a shape-space vector x; and an internal parameter for a motion model. In this case, the area of a target object is acquired by applying, for example, foreground extraction, facial extraction, pattern matching, heat distribution, and pressure distribution on the input image. On the other hand, by using both the edge image generated by the temporarily-set parameter for edge extraction and other temporarily-set environment-dependent parameters, the contour of the target object is estimated by the particle filter. The degree of matching of the area set by the estimated contour and the actually-detected area of the target object is estimated by comparing their feature amounts, and the propriety of the temporarily-set parameter is determined.

This allows an environment-dependent parameter to be adjusted based on the actual input image and the tracking accuracy to be maintained for the change in the image-capturing environment such as the brightness of the image. Also, the range of the placement of particles in a parameter space can be narrowed down; thus, highly-accurate tracking can be efficiently performed.

When the temporarily-set environment-dependent parameter does not reach the criteria, a similar determination is conducted after the other values are reset. Regarding the parameter for edge extraction, the setting order is determined in a direction so that the edge extracting frequency monotonically increases. This allows the optimal values of the parameter to be acquired before the reliability of the likelihood is lost due to the excessive extraction of edges and allows highly-accurate tracking to be achieved without causing a huge calculation load.

Described above is an explanation of the present invention based on the embodiments. The embodiment is intended to be illustrative only and it will be obvious to those skilled in the art that various modifications to constituting elements and processes could be developed and that such modifications are also within the scope of the present invention.

For example, in the embodiment 1, the contour image generation unit 22 includes the smoothing filter 62, the gradation lowering unit 64, and the edge extraction filter 66 as shown in FIG. 9 and generates a contour image by the processes thereof. On the other hand, the contour image generation unit 22 may be a general edge extractor and may be configured with, for example, only the smoothing filter 62 and the edge extraction filter 66. For example, when the surface or background of a target object does not go through any complicated change, the contour image generation can be achieved by an edge extractor. In this case, the likelihood can be also observed by performing an edge search by using the generated edge image. High-speed tracking processing can be realized by the parallelization of processes.

The contour image generation unit 22 may generate a contour image by a foreground extractor (not shown). For example, when tracking the movement of a player using the video of a soccer game as the input image, the pixel values are limited since the main background is a ground and the player has a uniform on. In a case like this, the contour of a target object can be extracted with high accuracy by a general foreground extraction process. In order to determine, based on, for example, the type of the input image, which of the above-stated processes the contour image generation unit 22 performs, a table associating the processes and, for example, the types of the input image may be prepared in advance. Alternatively, it may be set so that a user can change the setting.

Furthermore, the contour image generation unit 22 may be provided to an image processing apparatus other than the tracker 14. For example, the contour image of an object may be generated by the contour image generation unit 22 by providing the contour image generation unit 22 to an apparatus that automatically takes pictures and taking in the image of a subject. In this case, the position of the subject is calculated from the contour image, and automatic adjustment is carried out by feeding back the information to a control apparatus for the direction and position of the camera so that the subject is captured at a desired position such as the center of the picture. Alternatively, a feature can be achieved such as performing a desired process only on the area other than a specific object or the internal area of an object by providing the contour image generation unit 22 to a retouching apparatus and by extracting the contour line of the subject in an input image.

Furthermore, in a situation where the contour of a letter can be unclear such as with a writing transmitted via Fax or with a caption in the video recorded in a copied video tape, a boarder can be provided for the unclear part, and the contour of the letter can become clear as a result of taking the writing or the video as an image and inputting into the contour image generation unit 22. Therefore, it is also effective to provide the contour image generation unit 22 to, for example, an OCR (Optical Character Reader) or a data format converter.

In the embodiment 2, in order to efficiently obtain the optimal value of a parameter for edge extraction, the feature amounts are compared while changing each parameter so that the edge extracting frequency monotonically increases, and the parameter at the time the degree of matching exceeds the criteria is determined to be the optimal value. On the other hand, the environment-dependent parameters may be set to be all the values set in advance, and the value of the parameter with the highest matching of the feature amount may be determined to be the optimal value. In this case, as similar to the embodiments, a tracking process can also be performed by using parameters appropriate for the image-capturing environment or the change of a target object, and high tracking accuracy can be maintained under any environment as a result.

INDUSTRIAL APPLICABILITY

As described, the present invention is applicable to an information processing apparatus such as a visual tracker, computer, game device, image-capturing apparatus, and an imaging device.

The invention claimed is:

1. An object tracker comprising: a tracking processing unit operative to perform a tracking process of a target object, based on an estimated existence probability distribution of a target object in a first image frame, by defining the candidate contour of a target object in a second image frame, observing the likelihood of the candidate contour by matching against an edge image of the second image frame, and estimating the existence probability distribution of the target object in the second frame, the first image frame and the second image frame forming a moving image in which the target object to be tracked is captured; a target object area detection unit operative to detect the area of the target object in the first image frame by a predetermined analysis method and acquire a predetermined feature amount representing the area; an initial contour estimation unit operative to obtain the estimated existence probability distribution of the target object in the first image frame by temporarily setting at least any one of the values of parameters the tracking processing unit uses for a tracking process and estimate the contour of the target object based on the estimated existence probability distribution; and an initial value determination unit operative to compare the feature amount of the area of the target object based on the contour estimated by the initial contour estimation unit and the feature amount acquired by the target object area detection unit and, when the result of the comparison satisfies a predetermined condition, allows the tracking processing unit to start a tracking process by applying the value of the parameter temporarily set by the initial contour estimation unit.

2. The object tracker according to claim 1, wherein the parameter whose value is temporarily set by the initial contour estimation unit includes a parameter for edge extraction used for the generation of the edge image of an image frame.

3. The object tracker according to claim 2, wherein the initial contour estimation unit repeats the contour estimation of a target object by changing the value of a parameter until the result of the comparison satisfies the predetermined condition in the initial value determination unit and, when the parameter is the parameter for edge extraction, changes the value of the parameter in the direction so that an edge extracting frequency at the time of generating an edge image increases.

4. The object tracker according to claim 1 further comprising: an image processing unit operative to generate an edge image for matching against the candidate contour in order for the tracking processing unit to observe the likelihood, the image processing unit comprising: a gradation lowering unit operative to generate a low-gradation image obtained by lowering the number of gradations of a target image frame; and a contour image generation unit operative to generate an edge image, where the contour line of a subject in an original image is enhanced, by extracting an edge from the low-gradation image generated by the gradation lowering unit, wherein the parameter whose value is temporarily set by the initial contour estimation unit includes the number of gradations of the low-gradation image generated by the gradation lowering unit.

5. The object tracker according to claim 4, wherein the image processing unit further comprises a smoothing filter that lowers the frequency bandwidth of a target image frame and outputs accordingly to the gradation lowering unit.

6. The object tracker according to claim 1, wherein, when the result of the comparison satisfies the predetermined condition, the initial value determination unit allows, while determining the estimated existence probability distribution obtained by the initial contour estimation unit as the estimated existence probability distribution in the first image frame, the tracking processing unit to start a tracking process.

7. The object tracker according to claim 1, wherein, the tracking processing unit determines the candidate contour of the target object in the second image frame by transiting, according to a predetermined motion model, a curve generated based on the estimated existence probability distribution of the target object in the first image frame, and the parameter whose value is temporarily set by the initial contour estimation unit includes the parameter defining the motion model.

8. The object tracker according to claim 1, wherein the feature amount compared by the initial value determination unit includes at least any one of the center of gravity, range in an image, inclination, and color histogram of the area of a target object.

9. The object tracker according to claim 1, wherein the target object area detection unit detects the area of a target object by any one of the background difference, facial detection, pattern matching, heat distribution detection, and contact area detection.

10. The object tracker according to claim 1, wherein the initial contour estimation unit determines the candidate contour of a target object by transiting, according to a predetermined motion model, a curve generated in the area of a predetermined size including the area of the target object detected by the target object area detection unit and obtains the estimated existence probability distribution of the target object by observing the likelihood.

11. An object tracking method, whereby a computer performs a tracking process of a target object, based on an estimated existence probability distribution of a target object in a first image frame, by defining the candidate contour of a target object in a second image frame, observing the likelihood of the candidate contour by matching against an edge image of the second image frame, and estimating the existence probability distribution of the target object in the second frame, the first image frame and the second image frame forming a moving image in which the target object to be tracked is captured, comprising: reading the first image frame from memory storing a moving image, detecting the area of the target object in the image frame by a predetermined analysis method, and acquiring a predetermined feature amount representing the area; obtaining the estimated existence probability distribution of the target object in the first image frame by temporarily setting at least any one of the values of parameters used for a tracking process and estimating the contour of the target object based on the estimated existence probability distribution; and comparing the feature amount acquired in the acquiring the feature amount and the feature amount of the area of the target object based on the contour estimated in the estimating the contour and, when the result of the comparison satisfies a predetermined condition, starting a tracking process by applying the value of the temporarily-set parameter.

12. A computer program stored on a non-transitory computer readable medium, operative to achieve a tracking process of a target object, based on an estimated existence probability distribution of a target object in a first image frame, by defining the candidate contour of a target object in a second image frame, observing the likelihood of the candidate contour by matching against an edge image of the second image frame, and estimating the existence probability distribution of the target object in the second frame, the first image frame and the second image frame forming a moving image in which the target object to be tracked is captured, comprising: a module operative to read the first image frame from memory storing a moving image, to detect the area of the target object in the image frame by a predetermined analysis method, and to acquire a predetermined feature amount representing the area; a module operative to obtain the estimated existence probability distribution of the target object in the first image frame by temporarily setting at least any one of the values of parameters used for a tracking process and estimate the contour of the target object based on the estimated existence probability distribution; and a module operative to compare the feature amount acquired in the module of acquiring the feature amount and the feature amount of the area of the target object based on the contour estimated in the module of estimating the contour and, when the result of the comparison satisfies a predetermined condition, start a tracking process by applying the value of the temporarily-set parameter.

13. An image processing apparatus comprising:
a candidate contour determination unit operative to determine a candidate contour of a target object in a second image frame based on the estimated existence probability distribution of the target object in a first image frame, the first image frame and the second image frame being contained in an image stream forming moving image data in which the target object to be tracked is captured;
a gradation lowering unit operative to generate a low-gradation image obtained by lowering the number of gradations of the second image frame;
a contour image generation unit operative to generate a contour image, where the contour line of the target object in the second image frame is enhanced, by extracting an edge from the low-gradation image generated by the gradation lowering unit;
an observation unit operative to observe the likelihood of the candidate contour by matching the candidate contour determined by the candidate contour determination unit and the contour image of the second image frame generated by the contour image generation unit; and
a tracking result obtaining unit operative to estimate an existence probability distribution of the target object in the second image frame based on the likelihood observed by the observation unit.

14. The image processing apparatus according to claim 13 further comprising a smoothing filter that lowers the frequency bandwidth of image data and outputs accordingly to the gradation lowering unit.

15. An image processing method comprising:
determining a candidate contour of a target object in a second image frame based on the estimated existence probability distribution of the target object in a first image frame, the first image frame and the second image frame being contained in an image stream forming moving image data in which the target object to be tracked is captured;
generating a low-gradation image obtained by lowering the number of gradations of the second image frame;
generating a contour image, where the contour line of the target object in the second image frame is enhanced, by extracting an edge from the low-gradation image;
observing the likelihood of the candidate contour by matching the candidate contour and the contour image of the second image frame; and
estimating an existence probability distribution of the target object in the second image frame based on the observed likelihood.

16. A non-transitory computer readable medium encoded with a computer program comprising:
a module operative to determine a candidate contour of a target object in a second image frame based on the estimated existence probability distribution of the target object in a first image frame, the first image frame and the second image frame being contained in an image stream forming moving image data in which the target object to be tracked is captured;
a module operative to generate a low-gradation image obtained by lowering the number of gradations of the second image frame;
a module operative to generate a contour image, where the contour line of the target object in the second image frame is enhanced, by extracting an edge from the low-gradation image;
a module operative to observe the likelihood of the candidate contour by matching the candidate contour and the contour image of the second image frame; and
a module operative to estimate an existence probability distribution of the target object in the second image frame based on the observed likelihood.

* * * * *